United States Patent [19]
Filip et al.

[11] Patent Number: 5,414,812
[45] Date of Patent: May 9, 1995

[54] SYSTEM FOR USING OBJECT-ORIENTED HIERARCHICAL REPRESENTATION TO IMPLEMENT A CONFIGURATION DATABASE FOR A LAYERED COMPUTER NETWORK COMMUNICATIONS SUBSYSTEM

[75] Inventors: Michael J. Filip, Saratoga, Calif.; Kathy L. Karunungan, Rome, Italy; Jeffrey C. Kramer, Apple Valley, Minn.; Lucille C. Lee; Danielle L. Moore, both of Rome, Italy; Charles C. Shih, Mountain View; Jaroslaw J. Sydir, Campbell, both of Calif.

[73] Assignee: International Business Machines Corporation, Armonk, N.Y.

[21] Appl. No.: 296,990

[22] Filed: Aug. 26, 1994

Related U.S. Application Data

[63] Continuation of Ser. No. 858,784, Mar. 27, 1992, abandoned.

[51] Int. Cl.$^6$ .................. G06F 15/00; G06F 15/40; G06F 15/403
[52] U.S. Cl. .................. 395/200; 395/600; 395/700; 364/940.71; 364/940.92; 364/940.68; 364/222.2
[58] Field of Search .................. 395/700, 200, 600

[56] References Cited

U.S. PATENT DOCUMENTS

| | | | |
|---|---|---|---|
| 4,736,369 | 4/1988 | Brazilai et al. | 370/94 |
| 5,003,470 | 3/1991 | Carpenter et al. | 364/200 |
| 5,075,842 | 12/1991 | Lai | 395/425 |
| 5,075,845 | 12/1991 | Lai et al. | 395/425 |
| 5,075,848 | 12/1991 | Lai et al. | 395/425 |

OTHER PUBLICATIONS

Embry, J. et al., An Open Network Management Architecture: OSI/NM Forom Architecture and Concepts, Jul. 1990, pp. 14–22.

Naoto et al, An Implementation of Management Information Base, Apr. 7–9, 1991, pp. 318–321.

"An Information Model for Configuration Management of Switching Network Elements, Using OSI Tools", Maymon, 1991 IEEE.

"Object Modelling for OSI Management", Langsford, IEEE 1991.

"A Consolidated Data Model for Configuration Management of Network Switching Elements Concurrently Supporting ISDN and Conventional Subsriber Access", Debski et al, 1990 IEEE.

Maekawa, et al., "Operating Systems, Advanced Concepts," Copyright 1987 by The Benjamin/Cummings Publishing Co., Inc., pp. 177–206.

*Primary Examiner*—Thomas C. Lee
*Assistant Examiner*—Rehana P. Krick
*Attorney, Agent, or Firm*—Leslie G. Murray

[57] ABSTRACT

An object-oriented, hierarchical model of a computer network layered communications subsystem is implemented in a configuration database subsystem to create and maintain a configuration database and to provide configuration data to the layered communications subsystem. The layered communications subsystem is represented by a set of defined object classes, each object class corresponding to one or more functions defined at each of the communications subsystem layers, the object classes being related in a hierarchical relationship which preserves the functional relationship among the various functions in the various layers making up the layered communications subsystem. The configuration database subsystem provides a user interface for command and data input, a configuration support module which implements command processing, validation and object support programs which execute the input commands and allow a configuration database to be built and maintained while ensuring the integrity of the configuration data and the hierarchical relationship, and a database for storing the configuration database.

11 Claims, 8 Drawing Sheets

OBJECT CLASS HIERARCHY FOR CLNS.

OBJECT CLASS HIERARCHY FOR CLNS.

OBJECT CLASS HIERARCHY FOR CONS.

SYSTEM FOR USING OBJECT-ORIENTED HIERARCHICAL REPRESENTATION TO IMPLEMENT A CONFIGURATION DATABASE FOR A LAYERED COMPUTER NETWORK COMMUNICATIONS SUBSYSTEM

This is a continuation of application Ser. No. 07/858,784 filed Mar. 27, 1992 now abandoned.

BACKGROUND OF THE INVENTION

The present invention relates generally to a computer system having a hierarchically layered communications subsystem utilizing the Open System Interconnections (OSI) model. More particularly, the present invention relates to an object-oriented model for representing the OSI layers and communications network topology and for defining the communications subsystem configuration database.

The use of computer network systems for processing and transmitting data is well known in the prior art. A typical computer network system consists of at least one host computer running under some type of operating system, communication controllers or subsystems, communications media and a plurality of end users, terminals, printers, displays, for example. The host computer is connected, via communications media, to either a communication controller or an end user terminal. The communication controller interfaces with other communication controllers or end user terminals via communications media. The communications media may be telephone lines or microwave digital transmission channels via satellite, for example.

Maekawa et al, "Operating Systems-Advanced Concepts", copyright 1987 by The Benjamin/Cummings Publishing Co., pp. 177–206, define a distributed or networked system as a collection of independent computers and a communication facility therebetween for exchanging messages. Since such systems typically do not utilize shared memory, they must rely upon message passing as the basis for distributed operation and synchronization.

When computers or processes communicate by exchanging messages, there must be a set of established rules or protocols to govern the manner in which communication is allowed to take place. As Maekawa et al point out, various levels of protocols are required, for example, to ensure that buffer capacities are not exceeded and that messages are not lost.

In an attempt to standardize network architecture, the International Organization for Standardization (ISO) has adopted an architectural model referred to as "Open Systems Interconnections" (OSI). Reference should be made to the ISO International Standard 7498 relating to a model of OSI architecture. According to the standard, an "open system" represents a network as a hierarchical structure of "layers" of functions, each "layer" providing a collection of related functions that can be accessed and used by the "layer" above it in the hierarchy. Also, an "open systems interconnections" refers to a set of protocols used for communications between two or more open systems.

The ISO standard OSI model delineates seven layers (as shown in FIG. 3). These include from top to bottom, an application layer 7, a presentation layer 6, a session layer 5, a transport layer 4, a network layer 3, a data-link layer 2 and a physical layer 1.

It is usual for some of the layers to be combined or eliminated as a function of the application served. For example, layers 1–3 can be folded into a communications layer including the transmission of raw bit streams, the electrical cooperation between send and receive points, automatic error detection and recovery, and any packet and routing management requirements. Also, layers 6 and 7 may be folded together as a single applications layer in that they focus on the presentation and use of information. The functions of the session and transport layers are to provide connections (sessions) between specific pairs of processes (one in each layered subsystem) on one hand, and reliable host CPU-to-CPU communications on the other hand. Relatedly, the communications layer is usually implemented in hardware, whereas the application and intermediate layers, as now defined, are software implemented.

OSI, as a multiple layer architecture, establishes reliable communications among processes and guarantees that messages are received in the same order in which they are sent. In OSI, each layer may be viewed as a service provider. That is, it provides services to the layer, or user above it, in order to allow that user to communicate with its peer at another node. A layer provides these services by establishing a connection with the next lower layer in the hierarchy until it reaches the bottom or physical communication layer. At this point, a message is impressed upon the physical path, the network, to its destination. At the destination node, the same process is repeated but in reverse order.

The passage of messages vertically down the layers at an originating host computer, the transmission horizontally over the physical path or layer to the target computer, and the vertical processing up the target host are well described in the prior art. Most of the problems addressed by the prior art have been of the communications variety emphasizing the horizontal or peer-coupled aspects. These include the establishment of a session, routing and maintaining synchronization in the presence of noise or variable bandwidth. Illustratively, reference should be made to Barzilai et al, U.S. Pat. No. 4,736,369, "Adaptive Session-level Pacing", issued Apr. 5, 1988. Additional, Carpenter et al, U.S. Pat. No. 5,003,470, "Method for Tying and Untying Path Access in a CPU-Based, Layered Communications System", issued Mar. 26, 1991 is illustrative of a computer-implemented method for maintaining the integrity of ties connecting control blocks within each layer of a layered communication subsystem.

Typically, since they provide for vendor independent, any-to-any connectivity, open communications networks such as OSI are particularly difficult to configure. The ISO architecture and standards that embody this open philosophy of connectivity provide a greater amount of flexibility than can be found in proprietary standards. The amount of configuration data required by the implementation and consequently needed to be input by the end-user can therefore be quite complex and voluminous. Thus, defining and building an adequate database for configuration of the communications network becomes expensive and time consuming, often requiring the services of a programmer to complete.

SUMMARY OF THE INVENTION

It is accordingly a principal object of the present invention to provide an object-oriented, hierarchical model of a computer system OSI network which defines a database for configuration of that OSI network and provides a tool for an end-user to enter required data in the database.

It should be recalled that the OSI network is structured as a hierarchy of layers wherein each layer comprises a bevy of functions, the interrelations between the layers and the layer functions being defined by the hierarchical structure. Each layer is relatively independent of the other layers and may be viewed as providing one or more functional services to the layer above it in the hierarchy. Thus, modification or replacement of an implementation of one layer can be accomplished without major impact on the enclosing layers as long as the newly implemented layer delivers the same functional service to the layer above and calls out the functional service of the layer below. While this hierarchical structure is transparent to the end-user, a knowledge of the hierarchy and function relationships between the layers is required to define the configuration database.

It is accordingly another object of the present invention to provide an object-oriented, hierarchical model of an OSI network wherein a set of rules for entering and maintaining a configuration database preserves the hierarchy and interrelationship between the layers and the functions defined therein.

These and other objects of the present invention are accomplished by an OSI configuration database subsystem which implements an object-oriented, hierarchical paradigm for the configuration of computer communications systems in an open networking environment. In accordance with the principles of the present invention, the OSI configuration database subsystem comprises a user interface, a command processing means, a command execution means and database server means coupling the configuration database subsystem to storage means for storing the configuration database. The object-oriented, hierarchical model provides a hierarchical representation of a corresponding layered computer system communications subsystem (such as shown in FIG. 2) in which various functions are defined for each layer and which have a defined functional relationship with functions defined for at least one layer above or below a function's associated layer. While some functions may be associated with several layers, generally the functional relationship is based upon the services provided by a particular layer to the layers above or below as a message progresses vertically up or down through the layers while being passed between sending and receiving computers. The object-oriented, hierarchical model comprises a plurality of object classes, each object class being associated with a corresponding function associated with one or more layers in a layered OSI communications subsystem, a hierarchical relationship being defined between the plurality of object classes which represents and preserves the functional relationship between the associated corresponding functions defined for each layer in the layered OSI communications subsystem. Each object class comprises at least one object, each object being described by one or more attributes associated with that object class.

The OSI configuration database subsystem implements the object-oriented configuration model with a consistent set of commands for each of the object classes. In a preferred embodiment five basic commands, add, change, display, remove and list are defined, as applicable, for each object class. The command parameters correspond to the object class's attributes. Users can use the commands interactively, or in a program, to manipulate specific objects within the configuration database. When the commands are processed by the OSI configuration database subsystem, validation checks are completed at several stages prior to the data being stored in the configuration database and retrieved for use by the OSI communications subsystem. The validity checks provide enforcement of the hierarchical relationships between the various object classes and insure that the consistency and integrity of the configuration database is maintained.

Object classes group configuration data into more logical, pictorial and user-understandable modules. The object classes have clearly defined interrelationships which make it easier for a novice user to gain an overall understanding of the OSI communications subsystem configuration and the required configuration data and information.

Definition of object classes allow the end-user to build configuration databases for actual networks using only those objects that are needed, i.e. only the information that is required for configuration is requested and used. Additionally, the object classes are defined so that a user does not have to specify the same data more than once.

The use of an object-oriented model easily accommodates extensions to add new features and capabilities. Objects and attributes can be added to existing object classes without impacting other object classes. New object classes can be defined when new functions or features are added to the communications subsystem. Similarly, object classes can be deleted when no other object classes are dependent on them or when the associated, corresponding communications function becomes obsolete. Since each object class represents a tangible entry within the communications network, object class definitions are easily and naturally extendable to graphical user interfaces. Also, the object class definitions are easily extended to distributed and centralized configuration models. By defining new actions, i.e., commands, on the object classes, such as import/export commands, objects can be moved around to other systems, or put into distributed or central directories.

The object-oriented, hierarchical model approach to communications network configuration, and the object classes defined therein for the OSI networking environment, are abstract in nature and can be implemented in any OSI network implementation. Since all OSI implementations must, by definition, inter-operate with each other, they all must support the same or similar functions and therefore the same or similar object classes as defined by the present invention can be utilized in other OSI implementations. Since the ISO OSI communications model architecture is one of the most general and flexible of the networking architectures in use today, many of the concepts and object classes defined by the present invention are also valid in any open networking environment.

The object-oriented, hierarchical paradigm of the present invention defines 23 object classes corresponding to the ISO OSI communications model architecture which systematically organizes the configuration data in a manner that makes it more understandable and easier to use by an end-user. It is easily extendable to new OSI communications and networking functions and adaptable to graphical user interfaces. Additionally, because of its generality and abstractness, the object-oriented, hierarchical model of the present invention can potentially be adopted by OSI vendors and the standards committees for use in OSI communications network configuration and can also be incorporated within already established OSI protocols such as OSI System Management standards (ISO 9595) and OSI Directory standards (ISO 9594/CCITT X.500).

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENT

Figure 1:
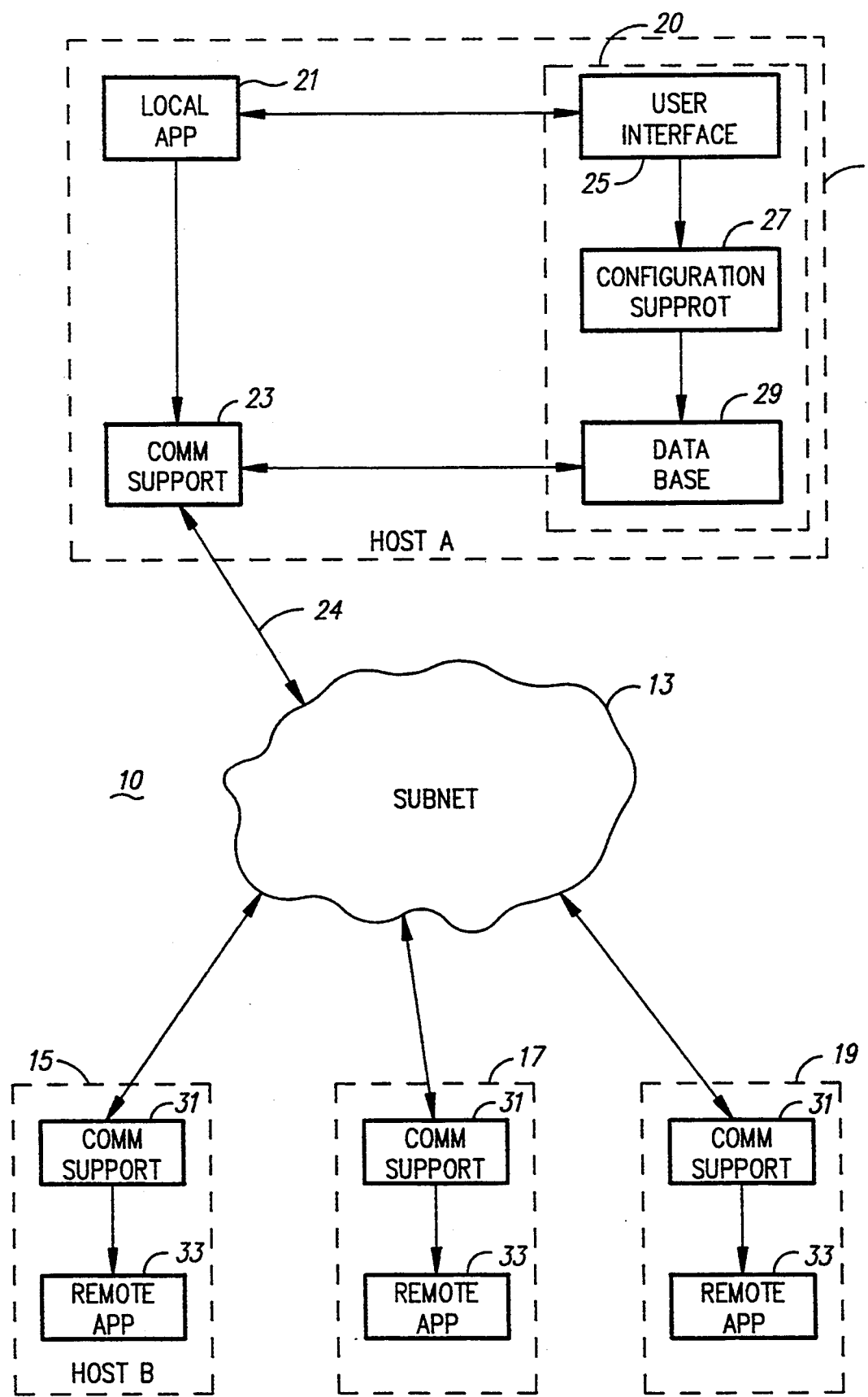
FIG. 1 is a conceptual block diagram illustrating an overview of a computer network incorporating the object-oriented, hierarchical model and a Configuration Database Support subsystem according to the principles of the present invention.

Referring now to FIG. 1, a conceptual block diagram illustrating a computer network utilizing an open system interconnects (OSI) communications architecture and incorporating an object-oriented, hierarchical model and configuration database support subsystem according to the principles of the present invention is shown. The term computer network is generally accepted to mean an interconnected collection of autonomous computers or machines. As shown in FIG. 1, in any network 10 there exists a collection of computers 11, 15, 17, 19 intended for running user, i.e., application, programs. Typically, these computers are referred to as "hosts", although, alternatively, they may be referred to as "local" and "remote". The hosts are connected by a communication subnet or transmission system 13 which carries messages from host to host. Broadly speaking, there are two general types of designs for the communication subnet 13: a connection oriented or point-to-point channel (CONS) or a connectionless or broadcast channel (CLNS).

Modern computer networks are designed in a highly structured manner. To reduce the design complexity, most networks are organized as a series of vertical layers or levels, each one built upon its predecessor. The number of layers, the name of each layer and the function of each layer differ from network to network and may differ from computer to computer on a network. However, in all networks, the purpose of each layer is to offer certain services to the higher layers, shielding those layers from the details of how the offered services are actually implemented.

Figure 2:
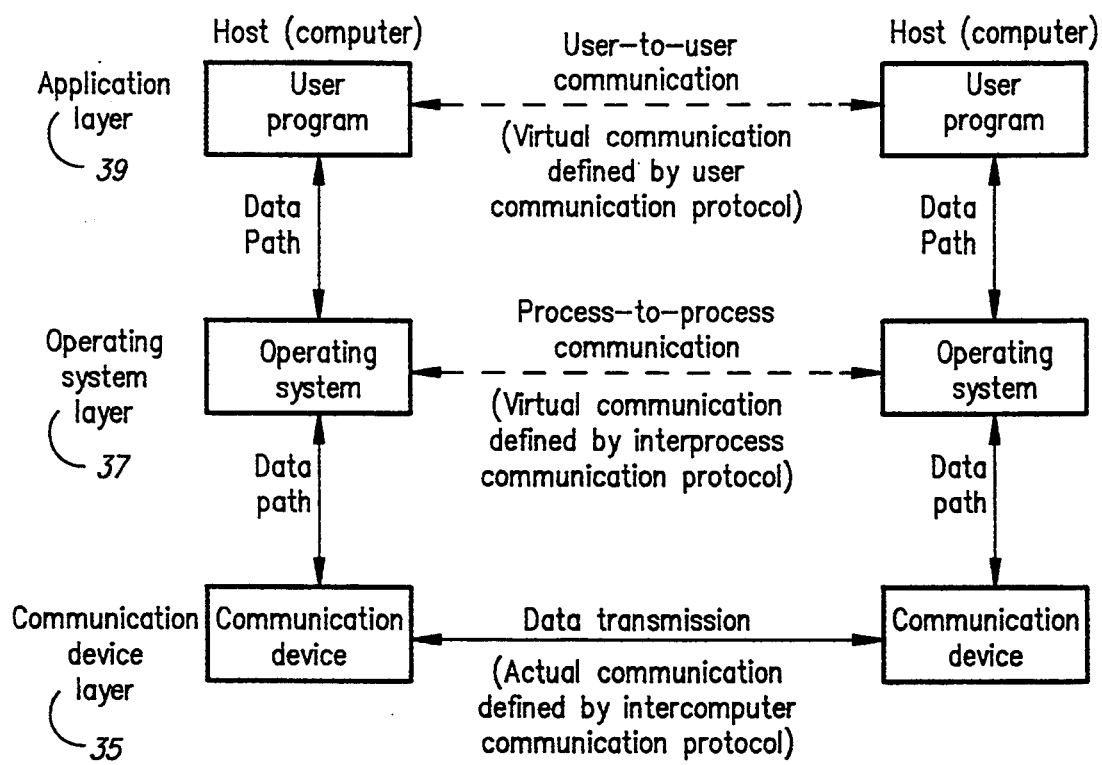
FIG. 2 is a block diagram illustrating a three-layer model network architecture.

Referring now also to FIG. 2, a three-layer model comprising a communication device 35, an operating system layer 37 and an application layer 39 is shown. Layer N on one host carries on a conversation with layer N on another host. The rules and conventions used in this conversation are collectively referred to as the layer n protocol. The set of layers and protocols is referred to as the network architecture. The entities comprising the corresponding layers on different hosts are referred to as peer processes. In other words, it is the peer processes that communicate using the protocol. Each pair of layers is separated by an interface. The interface defines which primitive operations and services the lower layer offers to the upper layer. In turn, each layer performs a specific collection of well understood functions.

In reality, no data are directly transferred from layer N on one host to layer N on another host (except at the lowest layer, i.e., the physical or subnet layer). Instead, rather, each layer passes data and control information to the layer immediately below it, until the lowest layer is reached. At the lowest layer, the communication device layer 35, there is physical communication with the other host, as opposed to the virtual communication between the hosts at the higher layers. In FIG. 2, virtual communication is indicated by dotted lines and physical communication by solid lines.

Figure 3:
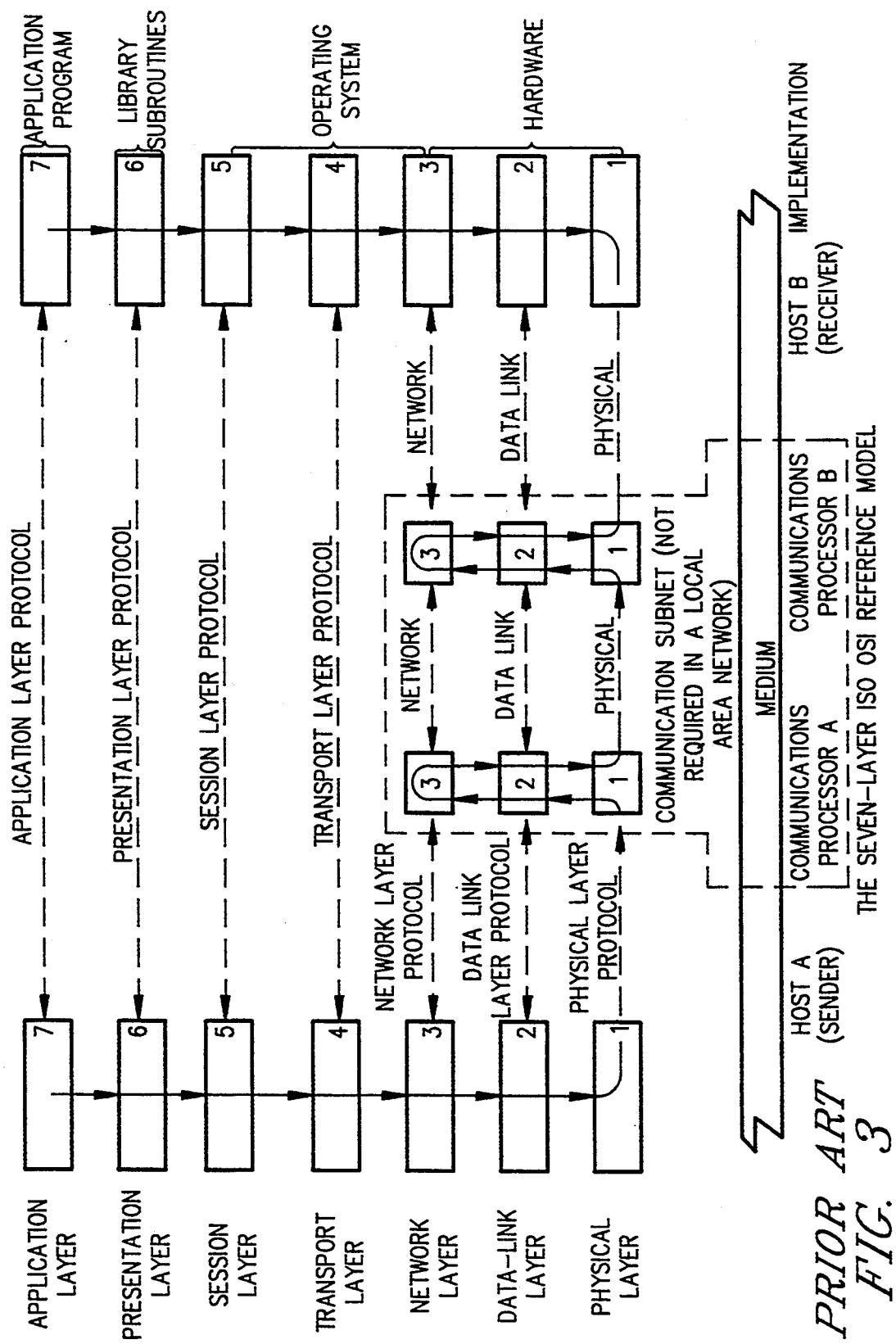
FIG. 3 is a diagram illustrating the seven-layer OSI OSI Reference Model network architecture as incorporated in FIG. 1.

Referring now to FIG. 3 and with continuing reference to FIG. 1, a seven-layer ISO OSI reference model for a computer network architecture is illustrated. As previously mentioned, several of the layers can be banded together without violating the principle of layered communications. That principle is that each layer constitutes a set of functions invoked by so-called primitives which are executable independent of other layers, although they are run in a predetermined order. Some of the functions may invoke functions residing in adjacent layers. That is, a function at layer N may call a function in layer N−1. The interface between two layers can be mandated through a service access point. Each host, host A 11, for example, on the network comprises a local or user application 21 coupled to a communications support subsystem 23 which is, in turn, coupled to the subnet 13. The communications support subsystem 23 is implemented by the host 11 operating system to provide a runtime environment in which the functions constituting the layers may be executed. For example, the functions constituting the layers may be implemented in a finite state machine. That is, a typical layer associates a state transition table and a number of connections at a layer interface. When a layer is invoked to perform a function for a particular connection, it will take the current state, request input a state transition table to find the software or hardware to process the request. The execution of the ascertained function changes the state of the connection and the layer, and may produce an output.

Illustratively, suppose host A 11 desired to send a message M to host B 15 over the OSI system having three layers; namely an application layer 39, an intermediate layer 37 and a communications layer 35 (as shown in FIG. 2). As each process constituting a successive layer is called, it operates upon the message, Thus, for a message M generated by the application layer 39, the intermediate layer 37 alters the message to become k1(M). Next, the communications layer 35, in turn, modifies the result to become k2(k1(M)). The composite message is sent over the subnet 13 and is received by the destination or target computer, host B 15 as k2(k1(M)). Since the composite is decomposed in inverse layer order, it is arguably demonstrated that each layer communicates with its peer. Thus, the intermediate layer at host A sends the message k1(M) to the intermediate layer at host B, while the application layer at host B is the only layer in receipt of the pristine original message M.

With continuing reference to FIG. 3, a more technical example illustrates virtual communication from the bottom layer 1 to the top layer 7 of the seven-layer OSI network architecture. A message, m, is produced by a process running in application layer 7. The message is passed from layer 7 to the presentation layer 6 according to the definition of the layer 6/7 interface. In this example, layer 6 transforms the message in certain ways, e.g., text compression, and passes the new message, M, to the session layer 5 across the layer 5/6 interface. Layer 5 may not modify the message but may simply regulate the direction of flow, for example. In like fashion, the message, M, is passed from layer to layer in descending order, each layer in turn performing work or executing some function as required to complete the communication of the message m from host A to host B. The tasks assigned to the various layers may include breaking up the message into smaller units and adding control headers including control information such as sequence numbers, to allow the peer process at the target host to get the pieces back together in the right order. In turn, the message is passed to the bottom or physical layer 1 for physical transmission over the subnet 13. At the receiving or target host the message moves upward, from layer to layer, with headers, etc., being stripped off as it progresses.

The relation between the virtual and actual communication, i.e., the peer process abstraction, and the difference between protocols and interfaces is crucial to the operation of an OSI network. For example, communication between corresponding layers, layer N, in a pair of hosts may have to take place when no common language exists between the two hosts. In this example, the layers below layer N in both of the hosts will have to perform the necessary translation to enable the two layer to communicate. Other issues such as data speed capabilities, message length and error-detection and correction codes, for example, must also be accounted for in different hosts on the network. Additionally, all parameters, including the address and physical route the message must take, must be specified for a particular message to be communicated between two or more particular hosts.

The process of setting up, i.e., designating, the tasks which must be accomplished by the various functions at their respective layers or levels in the OSI network to communicate a message from an application 21 in host A 11 to a remote application 33 at host B 15 is referred to as configuring the network. The configuration of the OSI network must be setup each time a message is sent. Typically, because of the complexity of most OSI networks, the configuration data for a host is maintained in a database, database 29, for example, and retrieved dynamically as required during the communication process. Typically, the configuration database is created and the required data is entered into the database when the OSI system is installed on a computer. Also, the configuration database must be maintained and amended as the capabilities of the network change and features are added or deleted.

With continuing reference to FIG. 1, a computer or host, host A 11, for example, comprises at least one user or local application 21 coupled to a communications support subsystem 23 which, in turn, couples the host to the subnet 13 via line 24. Line 24 implements the physical or bottom layer 1 of the OSI network and may comprise a two-wire cable or telephone line, for example. An OSI configuration database subsystem 20 according to the principles of the present invention comprises a user interface 25, coupled to a configuration support module 27 and, in turn, a configuration database 29 coupled to the configuration support module 27. The configuration support module 27 implements an object-oriented, hierarchical representation of the OSI layered network as implemented in the communications support subsystem 23 and various rule sets supporting that representation thus allowing the database subsystem 20 to provide a user tool for initially building and dynamically maintaining the configuration database 29. The configuration database 29 is also coupled to the communications support subsystem 23 to provide configuration data in real time as required for the various communications functions implemented therein to operate.

Figure 4:
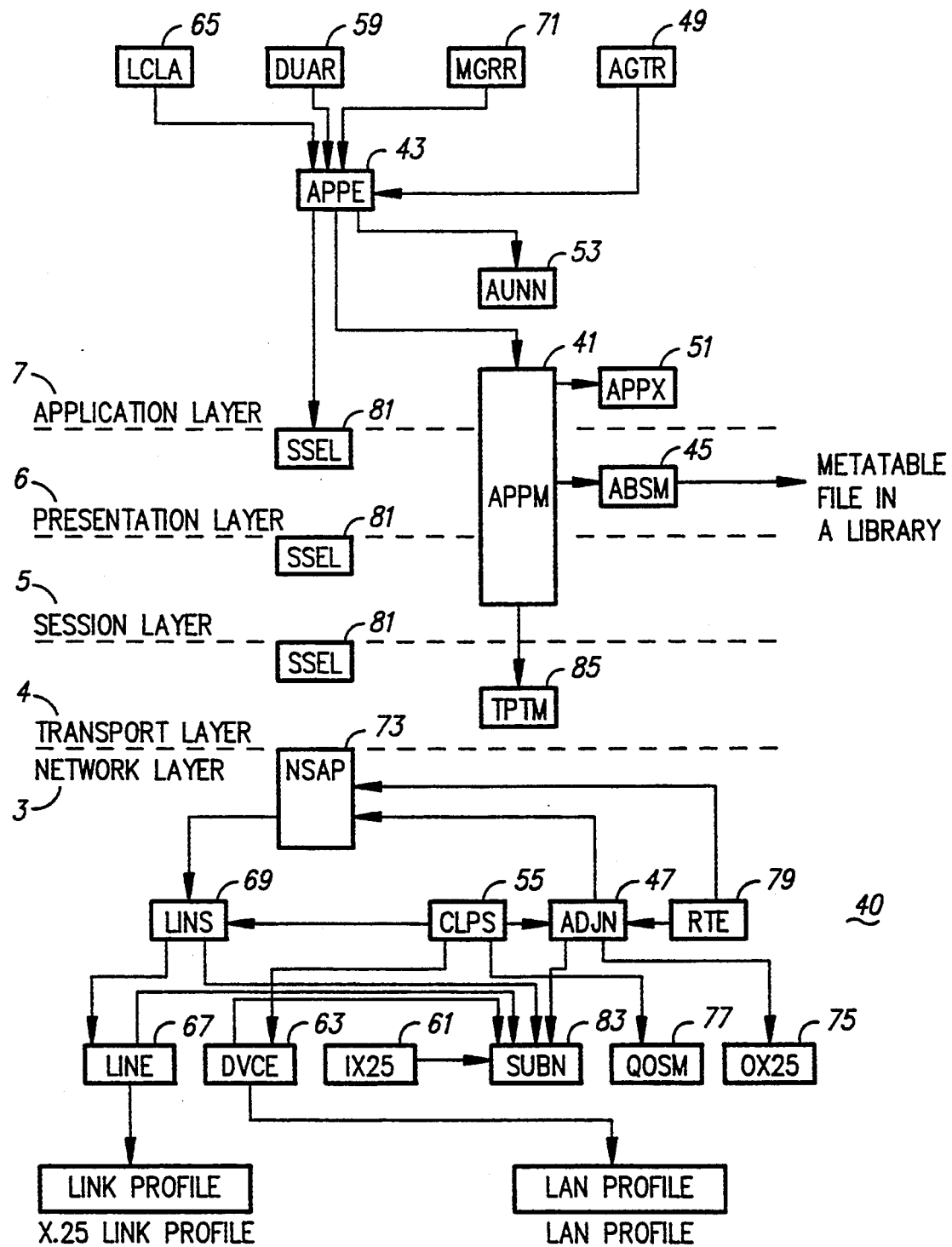
FIG. 4 is a diagram illustrating the object class hierarchy for connection-mode OSI network services according to the principles of the present invention.
Figure 5:
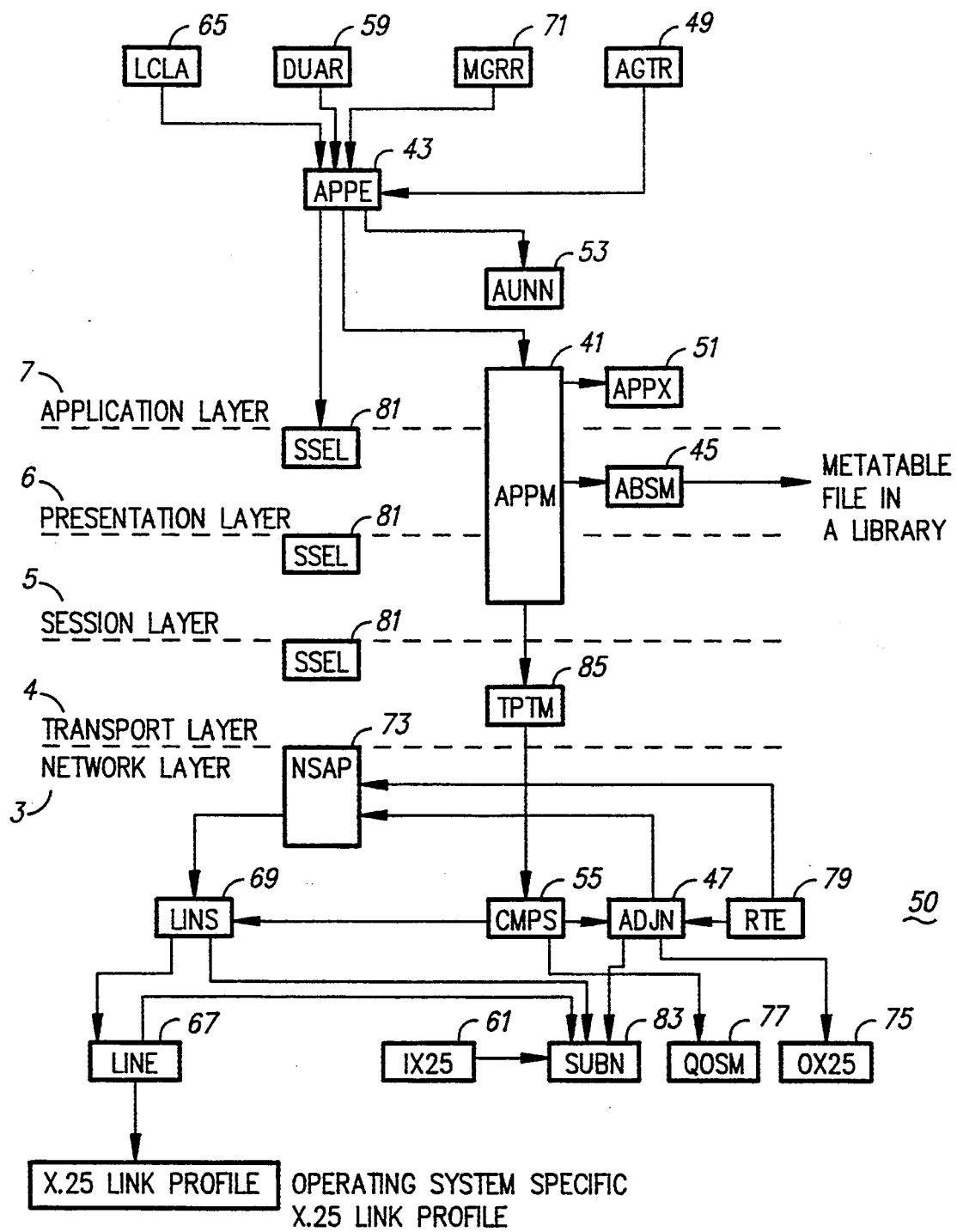
FIG. 5 is a diagram illustrating the object class hierarchy for connectionless-mode OSI network services according to the principles of the present invention.

Referring now also to FIGS. 4 and 5, a graphical illustration of an object-oriented, hierarchical model for a layered OSI network according to the principles of the present invention is shown. FIG. 4 illustrates the structure 40 for a connectionless or broadcast network while FIG. 5 illustrates the structure 50 for a connection-oriented network. Typically, prior art configuration schemes are based on editable files or a task oriented approach. The object-oriented, hierarchical model of the present invention comprises a set of object classes arranged in a hierarchical, functional relationship corresponding to the layered relationship of the OSI/Communications network implemented by the communications support subsystem 23. An object class closely represents something that is tangible within the network. Examples of 'things' that are physically tangible within a network are lines and routes or a software routine that provides data compression. There are also logical 'things' within a network that can be represented using object classes, the quality of service provided by a network route, for example. While object classes generally correspond to the various functions defined at the different layers of the OSI network, a particular object class may include several functions spanning two or more layers in the network structure, or a particular function may be represented in several object classes. For example, the Application Mode object class (APPM) 41 defines the presentation layer 6 and the session layer 5 services to be used by a local application and is functional subordinate to the Application Entity (APPE) 43 object class which defines the local applications available for use at the application layer 7. Object classes provide the user with a set of building blocks that are logical and modular and provide a graphical presentation of the OSI network configuration data which aids the user in organizing and comprehending the configuration data. An object describes a specific instance of a particular object class, and comprises of a group of configuration parameters called attributes. Objects of the same object class have the same attributes. The class of objects defined by a particular object class can be easily extended by adding new attributes or deleting obsolete attributes.

Once the object classes for the OSI network have been defined, the inter-dependencies among the object classes are specified to form the hierarchical relationship. The hierarchical model provides logical topology for the OSI communications network as perceived from an application. The hierarchical model allows 'higher' level objects in the hierarchy to refer to object classes that are 'lower' in the hierarchy. This means that the higher level objects have as their attributes, lower level object classes. In this manner, the object classes can be linked together to build arbitrarily large and complex networks, using only those 'pieces' (object classes) that are required for a particular communications network. The hierarchical model allows sharing of configuration data between higher level objects of lower level objects, i.e., several higher level objects can point to the same lower level object. This facilitates multiplexing and sharing of resources that is fundamental to all communications networking protocols.

Once the object class inter-dependencies and hierarchy are specified, the object class attributes are defined. The attributes are simply the configuration parameters that need to be specified for each of the object classes. Appendix A attached hereto lists the attributes for each object class defined corresponding to the OSI/communications network for the preferred embodiment.

To allow a user to create, build and maintain the configuration database, object classes and the attributes associated with those object classes are required to be manipulated. Operations or actions defined on object classes can be as limited or far ranging as necessary. In the preferred embodiment, the configuration support module 27 implements the following 5 basic operations:

ADD—Add a new object of a particular object class;
CHANGE—Change one or more attributes of an existing object;
DISPLAY—Display an existing object on a display means;
REMOVE—Remove an existing object from a specified object class;
LIST—Display a list of all the objects of a particular object class.

Other operations can be defined to provide additional features and capabilities for manipulation of the configuration database, export and import operations for moving objects of a particular object class between object classes and/or network systems. By defining the object classes, operations are conceptually easy to define, and once defined, are consistent for object classes and objects within an object class. This consistency simplifies the process for a user to learn and become efficient in manipulating the existing configuration data, as well as future extensions to the configuration database.

The configuration support module 27 also implements a set of validation rules defined for the object-oriented, hierarchical model which are required to be enforced to insure the consistency and integrity of the configuration database as the database is created and maintained. Several general types of validation rules must be specified, for example:

Object dependency—Object dependency rules are derived directly from the object class hierarchy. A higher level object cannot refer to a lower level object unless the lower level object already exists. Inversely, a lower level object cannot be removed if any higher level objects refer to it.

Conditional attributes—For a generic object class, some of the attributes are valid or invalid depending on the specific values of other attributes.

The object classes as defined for the OSI/communications subsystem configuration for the preferred embodiment are listed below (as shown in FIGS. 4 and 5):

Abstract Syntax (ABSN) 45—Define abstract syntaxes to be used for presentation layer encoding and decoding;

Adjacent Node (ADJN) 47—Define nodes that are connected to the same subnetwork (adjacent nodes);

Agent Registration (AGTR) 49—Register application entities with which the subsystem should attempt to establish management associations;

Application Entity (APPE) 43—Define local (at this node) and remote (at other nodes) applications entities;

Application Context (APPX) 51—Define application contexts;

Application Mode (APPM) 41—Define presentation and session layer services to be used by an application;

Authority Nickname (AUNN) 53—Define the authority nickname part of an application entity title in distinguished name format;

Connectionless Mode Path Set (CLPS) 55—Define a set of paths for reaching an adjacent node using connectionless mode network service;

Connection Mode Path Set (CMPS) 57—Define a set of paths for reaching an adjacent node using connection mode network service;

Directory User Registration (DUAR) 59—Register Directory User Agents (DUAs) that are allowed to use the services of the local Directory Service Agent (DSA);

Inbound X.25 Attributes (IX25) 61—Define attributes for inbound X.25 communication;

LAN Device (DVCE) 63—Define LAN devices at the local node;

Local Attributes (LCLA) 65—Set local attributes of the following types: Startup, Directory Services, Network Management, LAN;

Line (LINE) 67—Define X.25 lines at the local node;

Line Set (LINS) 69—Group similar lines for the purposes of starting, stopping and usage for communications;

Manager Registration (MGRR) 71—Register the remote application entities that are allowed to manage the local node;

Network Service Access Point Address (NSAP) 73—Define local and remote network addresses;

Outbound X.25 Attributes (OX25) 75—Define attributes for outbound X.25 communication;

0.25 Quality of Service (QOSM) 77—Define end-to-end quality of service parameters for X.25 communication;

OSI Route (RTE) 79—Define OSI routes for reaching destination nodes;

Local SAP Selector (SSEL) 81—Define local Service Access Point (SAP) selectors;

Subnetwork (SUBN) 83—Define subnetworks to which the local node is attached; and Transport Mode (TPTM) 85—Define transport layer options.

Figure 6:
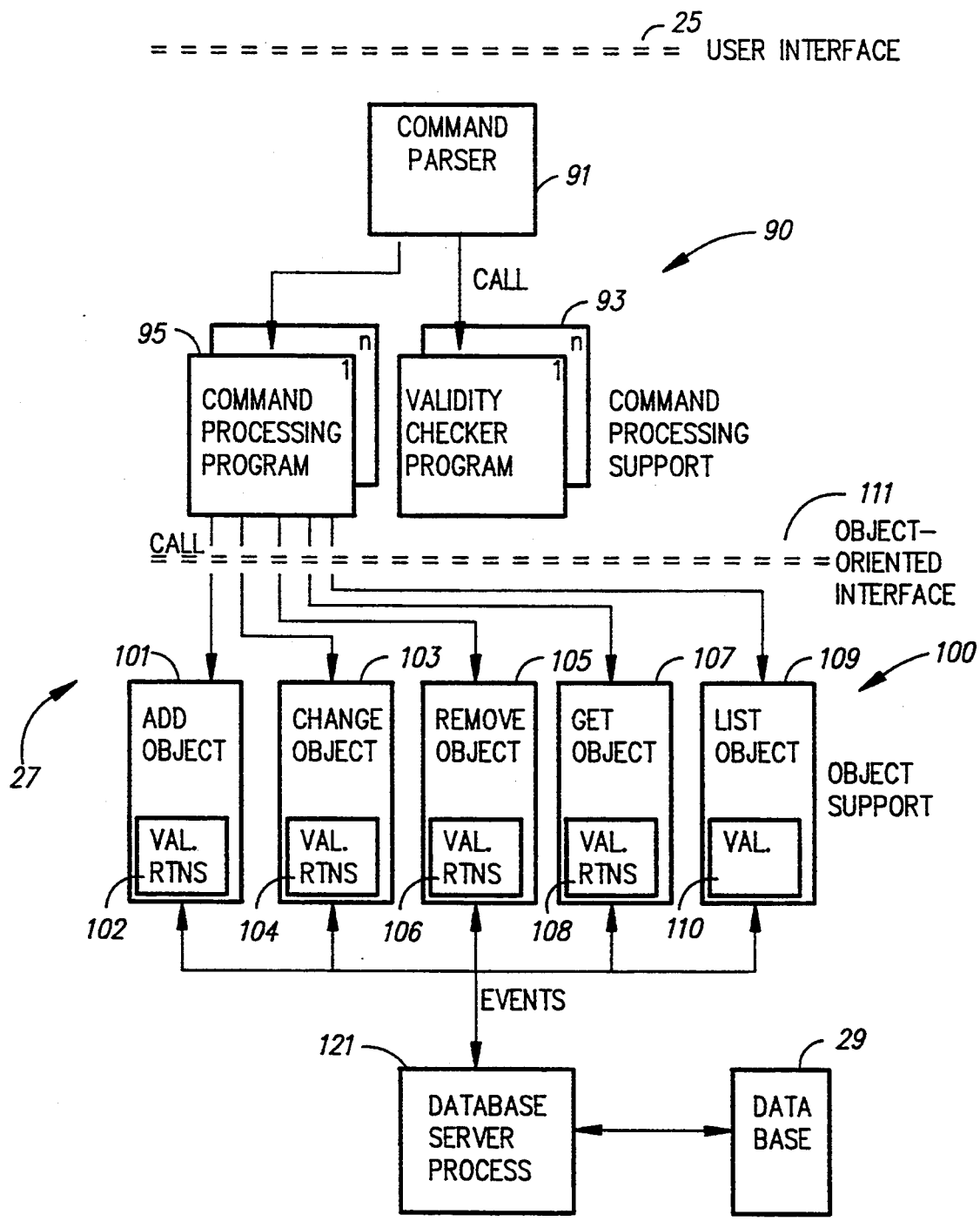
FIG. 6 is a block diagram illustrating the structure of the Configuration Database Support subsystem shown in FIG. 1.

Referring now also to FIG. 6, a detailed block diagram illustrating the organization of the database configuration support module 27 is shown. The configuration support module 27 comprises two primary components, the command processing support section 90 and the object support section 100. The command processing support section 90 is accessed by a user interface 25 that, in the preferred embodiment, comprises a command-driven interface, i.e., commands are input via an input device such as a keyboard (not shown). Alternatively, the user interface 25 may be a graphical interface such as a diagrammatical presentation on a video display accessed via a mouse or a touchscreen. The command processing support section 90 sets up command processing and provides initial validation checks for data being entered and other changes being made to the database 29. The object support section 100, including an object-oriented interface 111 implemented by the host computer operating system, provides a set of object support and validation programs which embody the object-oriented, hierarchical presentation of the data stored in the configuration database 29. The command processing support section 90 provides the database services requested via a command input by calling various programs from the object support section 100 which are executed by the object-oriented interface 111o The database server 121 provides database 29 access and translation services to the object support section 100 to support the particular database 29 format in use, for example, a flat file or an object-oriented or relational database format.

The command processing support section 90 comprises a command parser means 91, a set of validity checker programs 93 and a set of command processing programs 95. The command parser 91 parses the input commands, performs range checking type validation on input data and places the data in a common format. It then calls a validity checker program 93 to perform additional validation and a command processing program 95 to perform the database validations that may be necessary.

The validity checker programs 93 are used to do certain validity checking above and beyond the checking that can be accomplished by the command parser 91. For instance, object identifier checking is done by the validity checker programs 93 rather than by the command processing programs 95. It should be noted that not all commands will have a validity checker program. Validity checking in the command processing support section 90 consists of range and format checking that can be performed without accessing the data in the database. All validation of this type is performed prior to the command processing programs 95 being invoked.

One or more command processing programs 95 are invoked by the command parser 91 when all of the parameter data has been gathered and passed the range checking validation. The command processing program makes the object support section 100 and database 29 calls necessary to execute the input command.

A command processing program 95 is called by the command parser 91 when all of the necessary parameter checking is completed in order for the input command to be executed. The object-oriented interface 111 is used to perform the requested function and a message may be sent to the user, depending on the specific operation being performed. A pointer to each parameter is passed to the command processing program 95. The call or declaration for a command processing program 95 is as follows:

```
xxxxCtoo: PROCEDURE(PARM1@, PARM2@, ...., PARMN@);
    where xxxx is POSU for OS/2, QOUI for OS/400, and CMEU for MVS/VM
        t is the command type
        oo is the object type
    DCL PARM1@ PTR;
    DCL PARM2@ PTR;
        .
        .
    DCL PARMN@ PTR;
```

Validity checker programs 93 are called by the command parser 91 to perform certain validity checking that the command parser cannot do. If errors are detected, appropriate diagnostic messages are issued and an exception signalled. A pointer to each parameter is passed to the validity checker program. The call or declaration for the validity checker programs 93 is described below.

```
xxxxVtoo: PROCEDURE(PARM1@, PARM2@, ...., PARMN@);
    where xxxx is POSU for OS/2, QOUI for OS/400, and CMEU for MVS/VM
        t is the command type
        oo is the object type
    DCL PARM1@ PTR;
    DCL PARM2@ PTR;
        .
        .
    DCL PARMN@ PTR;
```

The object support section 100 provides an object-oriented interface 111 to the command processing support section 90. Support programs for ADD 101, CHANGE 103, REMOVE 105, GET 107 and LIST 109 are provided. There is one routine or program defined for each defined action for each object. Each routine performs all of the database 29 updates necessary, and reports any errors that are encountered. The call or declaration for the object support is as follows:

```
CALL xxxxIyyy(XDSDESC@, XDSPARM@, XDSRSLT@);
    where xxxx is  QOIU for OS/400
                   POSU for PS/2
                   CMEU for MVS/VM
          yyy is   ADD for Add Object
                   RMV for Remove Object
                   GET for Get Object
                   CHG for Change Object
                   LST for List Object
```

XDSDESC@ points to the data descriptor, which consists of the translate table name and object identification. This descriptor is used as input for all of the object-oriented interface calls. The declaration of the data descriptor is as follows:

```
DCL XDSDESC@ PTR;                    /* Data descriptor pointer   */
DCL 1 XDSDESCA BDY(#PBDY) BASED,     /* Data descriptor           */
    3 XDSTBLID CHAR(8),              /* Translate Table Identifier */
    3 XDSOBJID CHAR(4);              /* Object identification     */
RFY XDSDESCA BASED(XDSDESC@);
```

XDSPARM@ points to a parameter list which consists of a set of pointers to the attribute data, predicate data, list entry data, and cursor data for the operation. This area is used as input for all of the object-oriented interface calls; However, depending on the specific operation that is being performed, some of the pointers in this data structure are not required.

```
DCL XDSPARM@ PTR;                    /* Parameter list pointer    */
DCL 1 XDSPARMA BDY(#PBDY) BASED,     /* Object parameter area     */
    3 XDSDATA@ PTR,                  /* Pointer to data           */
    3 XDSPRED@ PTR,                  /* Pointer to predicate data */
    3 XDSLSTE@ PTR,                  /* Pointer to list entry data */
    3 XDSCRSR@ PTR;                  /* Pointer to cursor data    */
RFY XDSPARMA BASED(XDSPARM@);
```

XDSDATA@ contains a pointer to the data area for the operation. The first part of this structure always contains the number of lists for objects that contain list data. If the number of lists is greater than zero, the XDSLSTE@ pointer points to an area containing an array of list entry pointers and number of entries in each list. A miscellaneous flags field is also contained in the first part of the data. This field can be used for objects as needed such as Local Attributes (LCLA), where there are multiple sub-objects under a given object. It can be used to indicate which sub-object the data is for. The actual object data will vary from object to object. The declare for this data will typically be generated by the TRKey build process, and imbedded into this structure. All of the non-list data is filled into the structure&colon. The declare may have space for the data for a single list entry, but it is not filled in. The list entry field(s) contains all of the list entry data for a specific object.

```
DCL 1 COODATAA    BDY(#PBDY) BASED,  /* Data area              */
    3 COONLSTE    BIN(15),            /* Number of lists        */
    3 COOFLAGS    CHAR(l),            /* Miscellaneous flags    */
    3 *           CHAR(l),            /* Not used               */
    3
                  Object data goes here
                  .
                  .
                  .
                  ;
RFY COODATAA BASED(XDSDATA@);
```

XDSPRED@ contains a pointer to the predicate data for the operation.

```
DCL 1₃ COOPREDA BDY(#PBDY) BASED,    /* Predicate area         */
                Predicate data goes here
                .
                . .
                ;
RFY COOPREDA BASED(XDSPRED@);
```

XDSLSTE@ contains a pointer to an area containing pointers to the list(s) for the operation. If there are no lists, this pointer will be null. If there are lists, this area has the following format:

```
DCL 1 XDSLSTSA BDY(#PBDY)    BASED,   /* Lists area                    */
    3 XDSLST@(#MAXLSTS)      PTR,     /* Array of list pointers        */
    3 XDSL#ENT(#MAXLSTS)     BIN(15); /* Array containing number of
                                         entries in each list          */
RFY XDSLSTSA BASED(XDSLSTE@);
```

Each valid list pointer in the XDSLST@ array contains a pointer to the list entry area for that specific list. This area has the following format:

```
DCL 1 COOLSTA BDY(#PBDY)     BASED,   /* List entry area               */
    3 COOLSTE(#MAXLSTE),              /* Array of list entries         */
      5 COOCHGF CHAR(l),              /* Add/remove list entry flag,
```

-continued
```
                                      valid only for CHANGE
                                      commands,
                                      '00'X = ADD list entry,
                                      '01'X = REMOVE list entry */
    5 *        CHAR(3),              /* Not used                */
    5
               List entry data goes here
               .
               .
               .
               ;
DCL COOLPTR PTR;
RFY COOLSTA BASED(COOLPTR);
   /* NOTE: This assumes that COOLPTR has been or will be set
            to the appropriate list pointer from the XDSLST@
            array.                                             */
```

XDSCRSR@ contains a pointer to the cursor area for the operation. This area is valid only for work-with commands, and it has the following format:

```
DCL 1 XDSCRSRA BDY(#PBDY) BASED,     /* Cursor positioning area       */
      3 XDS#REQE BIN(15),            /* Num of list row entries
                                        requested by CPP              */
      3 XDSROWLN BIN(15),            /* Length of each list row
                                        maximum is 256 bytes          */
      3 XDSKEYLN BIN(IS),            /* Length of key (assumes it
                                        starts at beginning of row)   */
      3 XDSTRKEY BIN(15),            /* Trkey that defines the list   */
      3 XDSFLAGS,                    /* Flags area                    */
        5 XDSUNQKY BIT(1),           /* Key is unique (no need to
                                        remove duplicate entries)
                                        ON  = Key is not unique
                                        OFF = Key is unique           */
        5 *       BIT(7),            /* Reserved bits                 */
      3 *         CHAR(1),           /* Reserved                      */
      3 XDSCSRTP BIN(15),            /* Cursor type (first/next)      */
      3 XDSCPOSN,                    /* Cursor position indicators    */
        5 XDSCPOSL BIN(15),          /* Position part 1 from MIS      */
        5 XDSCPOS2 BIN(15);          /* Position part 2 from MIS      */
RFY XDSCRSRA BASED(XDSCRSR@);
```

XDSRSLT@ contains a pointer to the results area which has the following format:

```
DCL XDSRSLT@ PTR;                          /* Pointer to results area     */
DCL 1 XDSRSLTA BDY(#PBDY) BASED,           /* Validation results area     */
      3 XDSRETCD BIN(15),                  /* Validation return code      */
      3 XDSDIAGA CHAR(O);                  /* Validation diagnostic area  */
RFY XDSRSLTA BASED(XDSRSLT@);
The XDSRETCD variable has the following possible values:
DCL #OBRGOOD BIN(15) CONSTANT(O);          /*Good return code             */
DCL #OBRPSUC BIN(15) CONSTANT(4);          /*Partial success return code  */
DCL #OBRFAIL BIN(15) CONSTANT(B);          /*Failure return code          */
```

Figure 7:
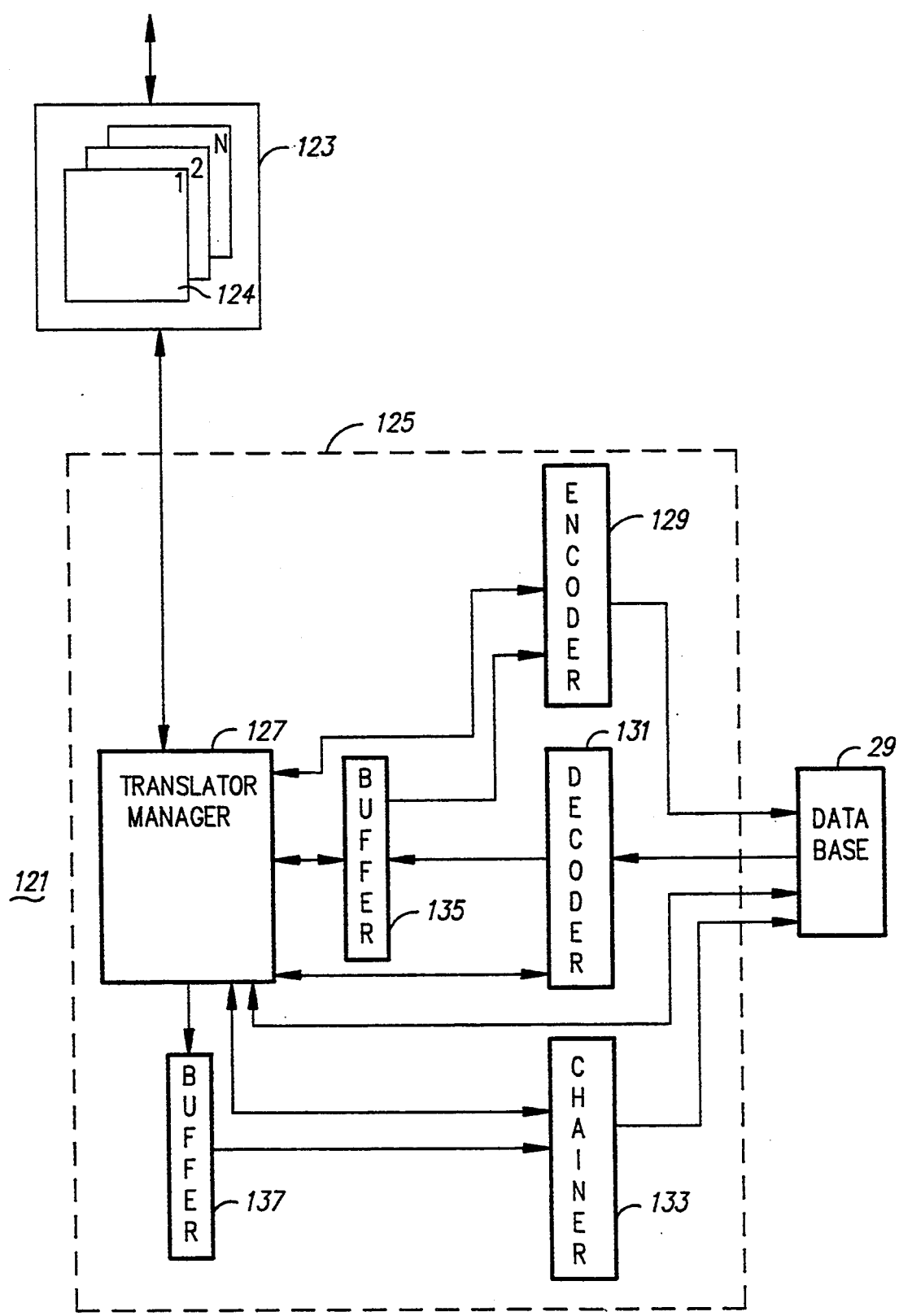
FIG. 7 is a block diagram illustrating the structure of the Database Server Process shown in FIG. 6.

Each object routine contains a set of validation routines 102, 104, 106, 108, 110, one per object. The validation routines use a set of database access macros 123 (as shown in FIG. 7) to retrieve data from or update the appropriate database 29 table(s). A return code is passed back to the command processing support 90 indicating success, partial success, or failure of a specific requested operation. Diagnostic or informational messages may also be issued by the validation routines containing additional information about the performed operation.

The specific object routines are described below:

Add Object xxxxIADD:    PROCEDURE(XDSDESC@, XDSPARM@, XDSRSLT@);

This procedure performs whatever validation is necessary and adds an object to the appropriate database tables. It is called by the ADD command processing programs. Table 1 below summarizes the specific parameters used by this procedure:

TABLE 1 xxxx1ADD Parameter Definitions

| Parameter | Input/Output | Description |
|---|---|---|
| XDSDESC@ | INPUT | Data descriptor |
| XDSPARM@ | INPUT | Parameter list |
| XDSDATA@ | INPUT | Object data |
| XDSPRED@ | NULL | Not used |
| XDSLSTE@ | INPUT or NULL | Used as input if there is list data |
| XLTCRSR@ | NULL | Not used |
| XLTRSLT@ | OUTPUT | Results |

Remove Object xxxxIRMV:    PROCEDURE(XDSDESC@, XDSPARM@, XDSRSLT@);

This procedure performs whatever validation is necessary and removes an object from the appropriate database table(s). It is called by the RMV command processing programs. Table 2 below summarizes the specific parameters used by this procedure:

TABLE 2

| xxxxIRMV Parameter Definitions | | |
|---|---|---|
| Parameter | Input/Output | Description |
| XDSDESC@ | INPUT | Data descriptor |
| XDSPARM@ | INPUT | Parameter list |
| XDSDATA@ | NULL | Not used |
| XDSPRED@ | INPUT | Predicate information that identifies the specific object to be removed |
| XDSLSTE@ | NULL | Not used |
| XLTCRSR@ | NULL | Not used |
| XLTRSLT@ | OUTPUT | Results |

Get Object xxxxIGET:  PROCEDURE(XDSDESC@, XDSPARM@, XDSRSLT@);

This procedure gets the contents of a specific instance of an object from the appropriate database table(s). It is called by the DSPXXXX and CHGXXXX command processing programs. Table 3 below summarizes the specific parameters used by this procedure:

TABLE 3

| xxxxGET Parameter Definitions | | |
|---|---|---|
| Parameter | Input/Output | Description |
| XDSDESC@ | INPUT | Data descriptor |
| XDSPARM@ | INPUT | Parameter list |
| XDSDATA@ | OUTPUT | Area where data is to be put |
| XDSPRED@ | INPUT | Predicate information that identifies the specific object instance to be retrieved |
| XDSLSTE@ | OUTPUT or NULL | List area data, if present |
| XLTCRSR@ | NULL | Not used |
| XLTRSLT@ | OUTPUT | Results |

Change Object xxxxICHG:  PROCEDURE(XDSDESC@, XDSPARM@, XDSRSLT@);

This procedure performs whatever validation is necessary and changes the instance of an object in the appropriate database table(s). It is called by the CHGXXXX command processing programs. Table 4 below summarizes the specific parameters used by this procedure:

TABLE 4

| xxxxICHG Parameter Definitions | | |
|---|---|---|
| Parameter | Input/Output | Description |
| XDSDESC@ | INPUT | Data descriptor |
| XDSPARM@ | INPUT | Parameter list |
| XDSDATA@ | INPUT | Changed object data (including an indication of which object is to be changed). |
| XDSPRED@ | NULL | Not used |
| XDSLSTE@ | INPUT or NULL | Used as input if there is list data |
| XLTCRSR@ | NULL | Not used |
| XLTRSLT@ | OUTPUT | Results |

List Object xxxxILST:  PROCEDURE(XDSDESC@, XDSPARM@, XDSRSLT@);

This procedure gets the key information for a number of objects that are of the same type from the appropriate database table(s). It is called by the LSTXXXX command processing programs. Table 5 below summarizes the specific parameters used by this procedure:

TABLE 5

| xxxxLST Parameter Definitions | | |
|---|---|---|
| Parameter | Input/Output | Description |
| XDSDESC@ | INPUT | Data descriptor |
| XDSPARM@ | INPUT | Parameter list |
| XDSDATA@ | OUTPUT | Contains the number of list entries that were returned, and for AUNN, the default authority ID nickname is also returned. |
| XDSPRED@ | INPUT and OUTPUT | Initially set to binary zeros by the command processing program. The list object routine will save the last key value returned here for use on subsequent calls |
| XDSLSTE@ | OUTPUT | List of objects that were retrieved |
| XLTCRSR@ | INPUT | Number of entries requested, cursor type (first), length of a list row, length of the database key data, key number, and an indicator as to whether the key is unique are input, and cursor position variables are not used. |
| XLTRSLT@ | OUTPUT | Results |

Referring now also to FIG. 7, the database server 121 provides services which the command processing program 95 call via the object-oriented interface 111 in order to communicate with the database 29. The database server 121 comprises a set of database access macros 123 and a configuration database translator 125. The database access macros 123 form an interface between the configuration support module 27 and each of the database services that are provided. The configuration database translator 125 builds and issues database requests.

The structure and function of the database server 121 is determined by the interface and the function of the underlying database. In general, the structure of the database server 121 will change based on the particular database format that is used and the grouping of the configuration data in the database 29.

The database server 121 provides simple data services comprising database reads and writes which are performed one at a time. The following simple services are supported:
Insert a record;
Delete a record;
Update a record;
Select a record; and Determine the existence of a record.

Two or more simple service requests can be chained into a chained request. The database server 121 guarantees the data integrity of requests in a chained request.

Distinguished names (DN) are an OSI construct that is used for uniquely naming entities in a network. The database provides several services for dealing with distinguished names:
 Resolve Relative Distinguished Name;
 Construct Distinguished Name;
 Add Distinguished Name; and
 Remove Distinguished Name.

500 Directory services is a directory service provided by the OSI protocol. The database provides the following Directory Services:
 Directory Service Add Request;
 Directory Service Modify Request;
 Directory Service Remove Request;
 Directory Service MAPP Request; and
 Directory Service CHECKC Request.

The database access macros 123 provide a method for making translator service calls. Each macro 124 sets up the code to initialize the parameter list for a particular call and invokes the translator 125 with this parameter list. One macro 124 is defined for each of the database services. Additionally, a database access marco 124 is defined for each of the associated database translator services provided for the building and submitting of chained requests:
 Create a chained request;
 Add a simple request to a chained request;
 Submit a chained request to the database; and
 Delete a chained request.

The configuration database translator 125 provides an interface to the database 29 by decoding and encoding request records and moving the data into and from the command process program structures. The database translator 125 isolates the command process programs from the configuration database structures as well as providing the transition from command process program data structures to Pascal data structures utilized in the actual database 29. The database translator 125 also provides any communications that are required for submitting requests to the database from the OSI/communications support subsystem 23 (as shown in FIG. 1). In the preferred embodiment, the command process programs are written in an internal programming language referred to as PL/xx, while the configuration database structures are written in Pascal.

The database translator 125 comprises a front end referred to as the translator manager 127, an encoder means 129, a decoder means 131 and a chainer means 133. In the preferred embodiment, the translator manager 127 is written in PL/xx, while the encoder 129, the decoder 131 and the chainer 133 are written in Pascal.

The translator manager 127 receives, routes, and stores all translator requests and returns all database responses to the caller. The building of database responses is handled by one of either the encoder 129, the decoder 131 or the chainer 133. These three components communicate with the translator manager 127 via common data buffer areas 135, 137. The encoder 131 builds database requests and couples them to the database 29. The decoder retrieves the return data from the database responses and places it into a buffer 135. The chainer 133 builds database request records for chained requests.

When a simple request is received, the translator manager 127 stores it in the common data area, buffer 135, from which the encoder 129 extracts the data and formulates a corresponding database request. The translator manager 127 then sends the request to the database 29 and awaits a response. Upon receiving the response, the translator manager 127 calls the decoder 131 to decode the response. The decoder 131 extracts the data from the database response structure and places it into the buffer 135 at the data area that was passed by the caller of the translator 121. The translator manager 127 then returns this data area to the calling program.

Chained requests are built through multiple translator calls. The caller submits each simple request separately, specifying on the call that the request is to be held and not submitted immediately. The translator manager stores each of these requests. The caller then requests a chained request to be created and requests that each of the previously sent simple requests be added to the chain. All of this information is placed in the common data area, buffer 137. When the chain is submitted for processing the chainer 133 is called to extract the data from the command process program data structures and to build a database request. The request is submitted to the database 29 and, when a response is received, the decoder is called to extract the return information and place it in the buffer 135 for further transfer to the calling program.

Figure 8:
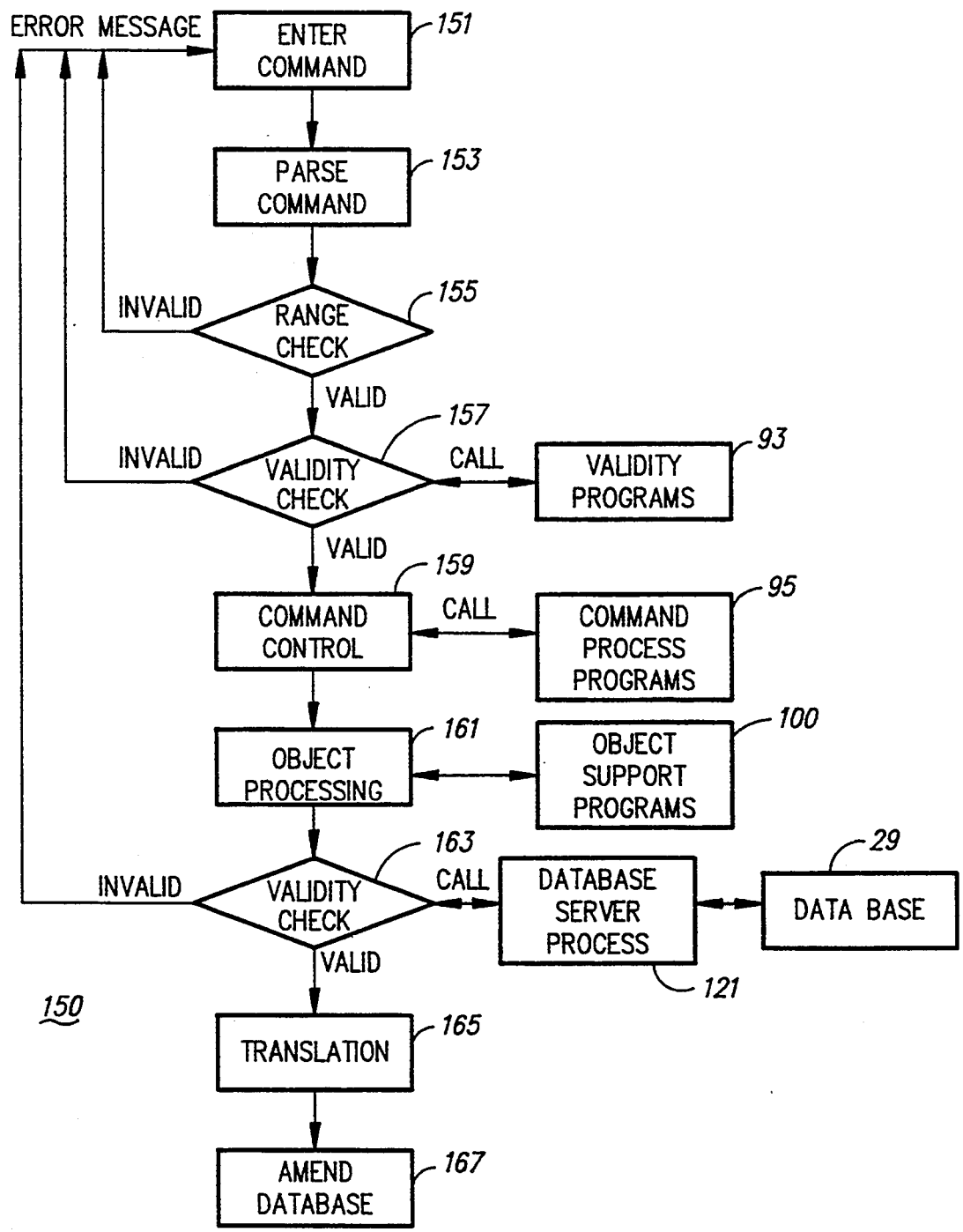
FIG. 8 is a diagram illustrating a flow chart of the configuration database creation and maintenance process.

Referring now also to FIG. 8, a flow chart illustrating the support process for building and maintaining the configuration database according to the present invention is shown. While the command processing structure and flow will vary with the type of command that is being executed, the flow chart shown in FIG. 8 represents the flow for a typical input command which adds data to or deletes data from the configuration database.

At block 151 a user commences the process by entering a command, to add a piece of data related to an object in a particular object class, for example. In the preferred embodiment, commands and associated data are entered via a computer keyboard. At blocks 153 and 155, the command parser means 91 (as shown in FIG. 6) parses the command, puts the data in the proper format and performs range checking for the type of data input. At block 157 one or more validity checker programs 93 are called to perform a first validation checks on the data, if required. Appendix D attached hereto provides a listing of examples of validity checker programs 93 utilized in the preferred embodiment. Invalid results at either the range check 155 or the first validity check 157 are returned to the user with an error message.

When a valid result from both the range and first validity check is obtained, a command process program 95 determined by the input command is called at block 159 to provide command processing control and pass the appropriate instructions to the object-oriented interface 111. Appendix C attached hereto provides a listing of examples of the command process programs 95 utilized in the preferred embodiment. One program is defined for each command, with the exception of the LSTxxxx commands, for which one command processing program will handle all of the list commands.

At the object processing block 161, the appropriate object support program 100 is called, ADD 101, for example, to process the input command. The object support program 100 performs all of the database 29 operations as required to execute the input command. The object support program includes a set of validation routines to provide a second validity check of the data and the requested database operation at block 163. Validity checks at this point may include retrieving data from the database 29 via the database server 121 for comparsion checks or level checks. Invalid results are returned to the user at block 151 along with diagnostic or error messages. Appendix E attached hereto provides a listing of examples of the object support programs 100 utilized in the preferred embodiment.

When valid data is results from the second validity checks, the data structures are passed to the database server 121 for translation at block 165 to the language and format used in the configuration database and then coupled to the database 29 where the configuration database is amended, block 167, as requested by the input command.

While the invention has been particularly shown and described with reference to a preferred embodiment thereof, it is understood by those skilled in the art that the invention is not to be limited to the disclosed embodiment, but that various modifications in the form and details may be made therein without departing from the spirit and scope of the appended claims.

APPENDIX A
CONFIGURATION OBJECT CLASSES

| Attribute Name | Attribute Description | Special Ussize | AS/400 | PS/2 |
|---|---|---|---|---|
| ABSTRACT SYNTAX ATTRIBUTES | | | | |
| ABSYNNNAM | Abstract syntax nickname | | X | X |
| ABYSSYN | OSI abstract syntax object identifier | | X | X |
| METAFILE | ASC Output file name (metatable) | System dependent string | X | X |
| ADJACENT NODE ATTRIBUTES | | | | |
| ANET | NET nickname | | X | X |
| SUBNET | Subnetwork name | | X | X |
| TYPE | network type | | | X |
| X25SUBNE | X.25 subnetwork entry | For X.25 subnetworks; one or more of the following sets | X | X |
| | DTE address of the remote node | | X | X |
| | Outbound X.25 attributes | | X | X |
| LANSUBNE | LAN subnetwork entry | For LAN subnetworks; one or more of the following | | X |
| | MAC address | | | X |
| AGENT REGISTRATION ATTRIBUTES | | | | |
| AGTSMAE | Agent application nickname | | X | X |
| APPLICATION CONTEXT ATTRIBUTES | | | | |
| APPCXTNNAM | Application context nickname | | X | X |
| APPCXT | Application context | Object Identifier format | X | X |
| APPLICATION ENTITY ATTRIBUTES | | | | |
| APPE | Application entity nickname | | X | X |
| OBJCLASS | X.500 object class | | X | X |
| AUTNNAM | Authority ID nickname | Optional part of distinguished name | X | X |
| APPCOM | Application process common name | Required part of distinguished name for the application entity | X | X |
| APECON | Application entity common name | Required part of distinguished name for the application entity | X | X |
| LCLAPPE | Local application entity flag | | X | X |
| APPTYPE | Application type | | X | X |
| APPMODE | Application mode name | To be used as default | X | X |
| LCLLAYER | OSI/CS layer name | For local application entity only | X | X |
| LCLSAPSELN | Top SAP name | Local APPE; Used to generate presentation address | X | X |
| LCLCODPAGE | Code page name | Local APPE; Code page to use for conversion | X | X |
| RMTPSAPSEL | Presentation SAP address | Specified for remote application entity only | X | X |
| RMTSSAPSEL | Session SAP address | Specified for remote application entity only | X | X |
| RMTTSAPSEL | Transport SAP address | Specified for remote application entity only | X | X |
| APPPTITLE | Application process title | Specified for remote application entity only | X | X |
| APPEQUAL | Application entity qualifier | integer, part of AE Title | X | X |
| LOCALITY | Locality name | Optional X.500 attribute | X | X |
| ORG | Organization name | Optional X.500 attribute | X | X |
| ORGUNIT | Organizational unit name | Optional X.500 attribute | X | X |
| TEXT | Description | Optional X.500 description attribute | X | X |
| SPTAPPCXT | Supported application context | Object identifier format; X.500 optional attribute | X | X |
| APPLICATION MODE ATTRIBUTES | | | | |
| APPHODE | Application mode name | | X | X |
| TPTMODE | Transport mode name | | X | X |
| NEXTLAYER | Next layer service flag | Presentation or Session | X | X |

-continued
APPENDIX A
CONFIGURATION OBJECT CLASSES

| Attribute Name | Attribute Description | Special Ussize | AS/400 | PS/2 |
|---|---|---|---|---|
| APPCXTNNAM | Application context nickname | Presentation layer only | X | X |
| DFTABSSYN | Default abstract syntax nickname | Presentation layer only | X | X |
| AGREEMENT | Use prior agreement for abstract syntax | Presentation layer only | X | X |
| PROABSSYN | Proposed abstract syntax list | Value list of abstract syntax nicknames | X | X |
| SSNVERSION | Session version | Version 1 or 2 | X | X |
| OPTDIAGTFR | Use optimized dialogue transfer flag | | X | X |
| DUPLEX | Duplex functional unit | Session functional unit | X | X |
| HALFDUPLEX | Half duplex functional unit | Session functional unit | X | X |
| EXCEPTION | Exceptions functional unit | Session functional unit | X | X |
| TYPEDATA | Typed data functional unit | Session functional unit | X | X |
| NEGRLS | Negotiated release functional unit | Session functional unit | X | X |
| HINORSYNC | Minor synchronization functional unit | Session functional unit | X | X |
| MAJORSYNC | Major synchronization functional unit | Session functional unit | X | X |
| RESYNC | Resynchronize functional unit | Session functional unit | X | X |
| EXPDATA | Expedited data functional unit | Session functional unit | X | X |
| ACTMGT | Activity management functional unit | Session functional unit | X | X |
| CAPABILITY | Capability data exchange functional unit | Session functional unit | X | X |
| DATATOKN | Half-duplex data token assignment | Session token assignment | X | X |
| MINORTOKN | Synchronize-minor token assignment | Session token assignment | X | X |
| MAJACTTOKN | Synchronize-major and activity management token assignment | Session token assignment | X | X |
| RLSTOKN | Negotiated release token assignment | Session token assignment | X | X |
| AUTHORITY NICKNAME ATTRIBUTES | | | | |
| AUTNNAM | Authority nickname | | X | X |
| DFTAUTNNAM | Default authority nickname flag | | X | X |
| RDNE | Sequence of RDNs | each RDN having the following | X | X |
| | Attribute type | | X | X |
| | Attribute value | | X | X |
| CLNS PATH SET ATTRIBUTES | | | | |
| ANET | ANET nickname | | X | X |
| TYPE | Subnetwork type | X.25 or LAN | | X |
| X25PATHE | X.25 path | for X.25 subnetwork; zero or more set of the following | X | X |
| | Subnetwork name | | X | X |
| | Line set name | | X | X |
| | DTE address of remote node | | X | X |
| | X.25 outbound attributes | | X | X |
| | X.25 QOS Mode | | X | X |
| LANPATHE | LAN path | for LAN subnetwork; zero or more sets of the following | | X |
| | Subnetwork name | | | X |
| | LAN Device name | | | X |
| | MAC address of remote node | | | X |
| MAINTAIN | CLNS maintain path flag | | X | X |
| CONNECTION MODE PATH SET ATTRIBUTES | | | | |
| CHPATHSET | Path set name | | X | X |
| X25PATHE | Path | One or more sets of the following | X | X |
| | Sequence number | | X | X |
| | Line set name | | X | X |
| | X.25 Network quality of service | | X | X |
| | Multiplex factor | | X | X |
| | Repeat count | | X | X |
| | Specific use flag | | X | X |
| | ANET nickname | if specific use flag is on | X | X |
| | DTE address | if specific use flag is on | X | X |
| | X.25 outbound attributes | if specific use flag is on | X | X |
| | Subnetwork | if specific use flag is on | X | X |

-continued

APPENDIX A
CONFIGURATION OBJECT CLASSES

| Attribute Name | Attribute Description | Special Ussize | AS/400 | PS/2 |
|---|---|---|---|---|
| LAN DEVICE ATTRIBUTES | | | | |
| DEVICE | LAN device name | | | X |
| SUBNET | Subnetwork name | | | X |
| ADAPTER | Adapter number | | | X |
| POOLSIZE | Pool size | | | X |
| PRIORITY | Transmit priority | | | X |
| DUA REGISTRATION ATTRIBUTES | | | | |
| DUAAPPE | DUA application nickname | | X | X |
| PASSWORD | DUA password | | X | X |
| INBOUND X.25 DTE ATTRIBUTES | | | | |
| SUBNET | Subnetwork name | | X | X |
| DTEADR | DTE address | Calling DTE | X | X |
| ACPCALL | Accept call from this address flag | | X | X |
| ACPRVSCRG | Accept reverse charging from this address flag | | X | X |
| LOCAL ATTRIBUTES | | | | |
| TYPE | Local attributes type | Directory, Network Management, Startup, or LAN | X | X |
| X500DIR | X.500 Usage | Directory attribute | X | X |
| DSAAPPE | DSA AE nickname | Directory attribute | X | X |
| CRDNCHK | Check credentials flag | Directory attribute | X | X |
| DUAAPPE | DUA AE nickname | Directory attribute | X | X |
| DAPTIMEOUT | Time-out for requests | Directory attribute | X | X |
| | DUA password | Directory attribute | X | X |
| SHAE | Management AE nickname | Network management attribute | X | X |
| STGMAX | Storage Maximum | Startup attribute | | X |
| STGFIRSTW | Storage first warning | Startup attribute | | X |
| STGFINALW | Storage final warning | Startup attribute | | X |
| STGRESET | Storage reset value | Startup attribute | | X |
| POPUPMSG | Pop-up messages | Startup attribute | | X |
| TRACE | Trace enable flag | Startup attribute | X | X |
| BUFFER | Trace buffer size | Startup attribute | | X |
| TRCFILE | Trace file name | Startup attribute | | X |
| UTCOFFSET | UTC time offset | Startup attribute; consist of the following | | X |
| | UTC time offset sign | | | X |
| | UTC time offset minutes | | | X |
| | UTC time offset seconds | | | X |
| APPSRV | Application layer services | Startup attribute; zero or more sets of the following | X | X |
| | Service name | | | X |
| | User name | | | X |
| | Initialization parameter | | | X |
| LSAP | LSAP | LAN attributes | | X |
| X.25 LINE ATTRIBUTES | | | | |
| LINE | Line name | | X | X |
| SUBNET | Subnetwork | | X | X |
| DTEADR | DTE address | | | X |
| XMITDTEADR | X.25 Transmit DTE address flag | | | X |
| LINESPEED | Line speed | | | X |
| LIND | AS/400 line description | | X | |
| AUTOSTART | Autostart flag | | X | X |
| THRPUTCLSN | Throughput class negotiation | | X | X |
| SDNTHRPUT | Send throughput | If throughput class negotiation | X | X |
| RCVTHRPUT | Send throughput | If throughput class negotiation | X | X |
| MAXSVC | Maximum SVCs | | X | X |
| LCLNSAPE | Reserved SVCs for individual NSAPs | Zero or more sets of the following | X | X |
| | Number of SVCs to reserve | | X | X |
| LINEEXT | Line extensions | One or more of the following | | X |
| | Line extension name | PS/2 Communications Manager routing table entry | | X |
| X.25 LINE SET ATTRIBUTES | | | | |
| LINESET | Line set name | | X | X |
| SUBNET | Subnetwork name | | X | X |
| LINE | Line names | one or more | X | X |
| AUTOSTART | Autostart | Start lines at subsystem startup | X | X |
| MANAGER REGISTRATION ATTRIBUTES | | | | |
| MGRSMAE | Manager application nickname | | X | X |
| ESTASSOC | Association establishment type | Whether association is to be established at start-up | X | X |
| NSAP ATTRIBUTES | | | | |
| NSAPNNAM | NSAP nickname | | X | X |

-continued
APPENDIX A
CONFIGURATION OBJECT CLASSES

| Attribute Name | Attribute Description | Special Ussize | AS/400 | PS/2 |
|---|---|---|---|---|
| NSAPADR | NSAP address | Preferred binary encoding | X | X |
| ADRTYPE | NSAP address type | | X | X |
| ACP1980CAL | X.25 accept 1980 calls | for local NSAPs | X | X |
| PCLID | Protocol Identifier | If accept 1980 X.25 calls and NSAP is local | X | X |
| OUTBOUND X.25 ATTRIBUTES | | | | |
| OUTX25A | X.25 outbound attribute set name | | X | X |
| X25NETLVL | X.25 network level | | X | X |
| FASTSELECT | X.25 fast select | | X | X |
| RVSCRG | X.25 reverse charging | | X | X |
| USRGRP | X.25 user group flag | | X | X |
| USRGRPID | X.25 user group ID | if user group flag is yes | X | X |
| USRDTA | X.25 call user data | | X | X |
| PASTHRFCL | X.25 pass through facilities | | X | X |
| X.25 QUALITY OF SERVICE MODE ATTRIBUTES | | | | |
| QOSMODE | X.25 QOS Mode Name | | X | X |
| TRANSDLY | X.25 Transit delay processing flag | | X | X |
| DTATHRPUT | X.25 Data throughput processing flag | | X | X |
| TRANSTGT | X.25 Transit delay target | If transit delay processing | X | X |
| TRANSMAX | X.25 Maximum transit delay | If transit delay processing | X | X |
| THRSNDTGT | X.25 Target throughput for | If data throughput processing send | X | X |
| THRSNDMIN | X.25 Minimum throughput for | If data throughput processing send | X | X |
| THRPCVTGT | X.25 Throughput target for | If data throughput processing receive | X | X |
| THRPCVMIN | X.25 Minimum throughput for | If data throughput processing receive | X | X |
| ROUTE ATTRIBUTES | | | | |
| DEST | Destination NSAP nickname | | X | X |
| ANETE | Route | One or more sets of the following | X | X |
| | ANET Nickname | Relay ANET | X | X |
| | Network service | CLNS, CONS, or BOTH | X | X |
| | CLNS Optimal segment size | required if CLNS | X | X |
| LOCAL SAP SELECTOR ATTRIBUTES | | | | |
| SAPSELNNAM | Local SAP name | | X | X |
| LAYER | OSI layer | Presentation, session, or transport | X | X |
| SAPSEL | SAP selector | | X | X |
| NEXTSAP | Next lower layer SAP name | | X | X |
| SUBNETWORK ATTRIBUTES | | | | |
| SUBNET | Subnetwork name | | X | X |
| TYPE | Subnetwork type | LAND or X.25 | | X |
| X25NETLVL | X.25 protocol Level | For X.25 subnetwork | X | X |
| LANPCL | LAN protocol | For LAN subnetwork | X | X |
| MAXSDU | CLNS maximum service data unit (SDU) | If network service is CLNS | X | X |
| TEXT | Description | | X | X |
| TRANSPORT MODE ATTRIBUTES | | | | |
| TPTMODE | Transport mode name | | X | X |
| CLASS | Transport class | | X | X |
| NETSRV | Network service type | CLNS or CONS | X | X |
| CMPATHSET | Connection mode path set name | Required for CONS | X | X |
| TPDUSIZE | TPDU size | | X | X |
| TCMMCFMTH | Connect confirm wait time | | X | X |
| CLASSNEG | Class negotiation | for classes 2 and 4 | X | X |
| T2DSCCFMTM | Disconnect confirm wait | for classes 2 and 4 | X | X |
| T2FLWCTL | Use explicit flow control | for classes 2 and 4 | X | X |
| EXTFMT | Use extended format | for classes 2 and 4 | X | X |
| PEERCREDIT | Initial peer credit | for classes 2 and 4 | X | X |
| RCVTPDU | TPDUs received before response | for classes 2 and 4 | X | X |
| AKWAITTM | Acknowledgement wait time | for classes 2 and 4 | X | X |
| T4NETASMT | Network connection assignment | for class 4 only | X | X |
| T4CHKSUM | Include class 4 checksum | for class 4 only | X | X |
| TRNBRRTRY | Number of TPDUs to retransmit | for class 4 only | X | X |

-continued

APPENDIX A
CONFIGURATION OBJECT CLASSES

| Attribute Name | Attribute Description | Special Ussize | AS/400 | PS/2 |
|---|---|---|---|---|
| T4MNCOUNT | Transmission count | for class 4 only | X | X |
| T4RTNTM | Retransmit time | for class 4 only | X | X |
| T4GVUPTM | Give-up time | for class 4 only | X | X |
| T4INACTTM | Inactivity time | for class 4 only | X | X |
| T4WDWTM | Window time | for class 4 only | X | X |
| T4RSRNTM | Reference release time | for class 4 only | X | X |
| T4TCNNTM | Connect response wait time | for class 4 only | X | X |
| CLNSPDUPTY | CLNS NPDU Priority | for class 4 and CLNS | X | X |
| CLNSCHKSUM | Include CLNS checksum | for class 4 and CLNS | X | X |
| CLNSEGMENT | Allow CLNS segmentation | for class 4 and CLNS | X | X |
| CLNSQOSMNT | Use CLNS QOS maintenance | for class 4 and CLNS | X | X |
| CLNSSOD | Sequence over minimal delay | for class 4 and CLNS | X | X |
| CLNSDOC | Minimal delay over cost | for class 4 and CLNS | X | X |
| CLNSEOD | Low error rate over delay | for class 4 and CLNS | X | X |
| CLNSEOC | Low error rate over cost | for class 4 and CLNS | X | X |

APPENDIX B

| | CONFIGURATION COMMANDS | | | | |
|---|---|---|---|---|---|
| Object Class | Add | Change | Display | Remove | Display-all |
| Abstract Syntax (ABSN) | X | X | X | X | X |
| Adjacent Node (ADJN) | X | X | X | X | X |
| Agent Registration (AGTR) | X | | | X | X |
| Application Entity (APPE) | X | X | X | X | X |
| Application Context (APPX) | X | X | X | X | X |
| Application Mode (APPM) | X | X | X | X | X |
| Authority Nickname (AUNN) | X | X | X | X | X |
| Connectionless Mode Path Set (CLPS) | X | X | X | X | X |
| Connection mode path set (CMPS) | X | X | X | X | X |
| Directory User Registration (DUAR) | X | X | X | X | X |
| Inbound X.25 Attributes (IX25) | X | X | X | X | X |
| LAN Device (DVCE) | X | X | X | X | X |
| Local Attributes (LCLA) | | X | X | | |
| Line (LINE) | X | X | X | X | X |
| Line Set (LINS) | X | X | X | X | X |
| Manager Registration (MGRR) | X | X | X | X | X |
| Network Service Access Point Address (NSAP) | X | X | X | X | X |
| Outbound X.25 Attributes (OX25) | X | X | X | X | X |
| X.25 Quality of Service (QOSM) | X | X | X | X | X |
| OSI Route (RTE) | X | X | X | X | X |
| Local SAP Selector (SSEL) | X | X | X | X | X |
| Subnetwork (SUBN) | X | X | X | X | X |
| Transport Mode (TPTM) | X | X | X | X | X |

APPENDIX C

ADD COMMANDS

One command processing program is provided for each ADDXXXX command.
The pointer to each parameter is passed as input. The logic overview
for add commands is as follows:

```
xxxxCAoo; PROCEDURE(PARM1@, PARM2@, ...., PARMN@);
  DCL PARM1@ PTR;
  DCL PARM2@ PTR;
       .
       .
       .
  DCL PARMN@ PTR;
  Get storage;
  Build object-oriented interface structures;
  CALL xxxxIADD (XDSDESC@, XDSPARM@, XDSRSLT@);
  SELECT(Return code);
    WHEN(Good)
      Send adjacent node successfully added message to user;
    OTHERWISE
      Send failure message to user;
  END;
  Free storage;
END xxxxCAoo;
```

CHANGE COMMANDS

One command processing program is provided for each CHGXXXX command.
The pointer to each parameter is passed as input. The logic overview

APPENDIX C for add commands is as follows:
```
xxxxCCoo: PROCEDURE(PARM1@, PARM2@, ...., PARMN@);
  DCL PARM1@ PTR;
  DCL PARM2@ PTR;
     .
     .
  DCL PARMN@ PTR;
  Get storage required for this operation;
  Build object-oriented interface structures;
  Set XDSDATA@ = ADDR(xxxxGET data area);
  CALL xxxxIGET(XDSDESC@, XDSPARM@, XDSRSLT@);
  IF return code is good THEN
    DO;
      Validity check actual object values against the values
        specified in the command. Issue a diagnostic message for
        each error that is found;
      IF no errors were found THEN
        DO;
        Set up change object-oriented structures, based on values
          passed to the CPP and actual values from the object
          that were retrieved;
        Fill in 'default' values for parameters that are no longer
          valid due to changes that were made.
        Set XDSDATA@ = ADDR(xxxxCHG data area);
        CALL xxxxICHG(XDSDESC@, XDSPARM@, XDSRSLT@);
        SELECT(Return code);
          WHEN(Good)
            Send successful message to user;
          WHEN(partial success)
            Send partial success message to the user;
          OTHERWISE
            Send failure message to user;
        END;
      END;
    ELSE
      DO;
      Send object not changed message to user;
      END;
    END;
  ELSE
    DO;
    Send object not changed message to user;
    END;
  Free storage;
END xxxxCCoo;
```
DISPLAY COMMANDS
One command processing program is provided for each DSPXXXX command.
The pointer to each parameter is passed as input. The logic overview
for add commands is as follows:
```
xxxxCDoo: PROCEDURE(PARM1@, PARM2@, ...., PARMN@);
  DCL PARM1@ PTR;
  DCL PARM2@ PTR;
     .
     .
  DCL PARMN@ PTR;
  Get storage;
  Build object-oriented interface structures;
  CALL xxxxIGET(XDSDESC@, XDSPARM@, XDSRSLT@);
  IF return code is good THEN
    DO;
      Display the results on the screen or place them in a spooled
        file, depending on the value of the OUTPUT keyword;
    END;
  ELSE
    DO;
      Send "Error occurred on DSPOSIXXXX command' message to user;
    END;
  Free storage;
END xxxxCDoo;
```
REMOVE COMMANDS
One command processing program is provided for each RMVXXXX command.
The pointer to each parameter is passed as input. The logic overview
for add commands is as follows:
```
xxxxCRoo: PROCEDURE(PARM1@, PARM2@, ...., PARMN@);
  DCL PARM1@ PTR;
  DCL PARM2@ PTR;
     .
     .
  DCL PARMN@ PTR;
  Get storage;
```

APPENDIX C
-continued

Build object-oriented interface structures;
CALL xxxxIRMV(XDSDESC@, XDSPARM@, XDSRSLT@);
SELECT(Return code);
  WHEN(GoodO)
    Send successfully message to the user;
  WHEN(Partial success)
    Send partial success message to the user;
  OTHERWISE
    Send failure message to user;
END;
Free storage;
END xxxxCRoo;

LIST COMMANDS

One command processing program is being provided to process all of the LSTXXXX commands. All list commands are being defined with a 'silent' parameter called OBJTYPE which indicates the specific command that was executed. OBJTYPE will be a CHAR(4) CONSTANT parameter in the command definition source and it will contain the last three or four characters of the command name.
The logic overview for add commands is as follows:
    xxxxCLST: PROCEDURE(OBJTYPE@);
    DCL OBJTYPE@ PTR
    Set up dialog variables;
    Display the appropriate work with panel
    END xxxxCLST;

APPENDIX D
VALIDITY CHECKER PROGRAMS

Validity checker programs will be used for the following commands:
1. ADDABSN, CHGABSN
    - OBJID is in proper object identifier format
2. ADDADJN, CHGADJN
    - The DTE addresses in the X25SUBNE parameter contain between 1 and 15 decimal digits
3. ADDAPPE, CHGAPPE
    - RMTPSAPSEL contains an even number of hexadecimal digits (between 2 and 32 digits)
    - RMTSSAPSEL contains an even number of hexadecimal digits (between 2 and 32 digits)
    - RMTTSAPSEL contains an even number of hexadecimal digits (between 2 and 64 digits)
    - RMTNSAPADR contains an even number of hexadecimal digits (between 2 and 40 digits)
    - APPPTITLE is in proper object identifier format
    - SPTAPPCXT is in proper object identifier format
4. ADDAPPM, CHGAPPM
    - #ACSE is not specified in the proposed abstract syntax list.
5. ADDAPPX, CHGAPPX
    - APPCXT is in proper object identifier format.
6. ADDAUNN
    - RDN entries are specified correctly.
7. ADDCLPS, CHGCLPS
    - The DTE addresses in the X25SUBNE parameter contain between 1 and 15 decimal digits, and each X25SUBNE list entry is specified correctly.
8. ADDCMPS, CHGCMPS
    - The DTE addresses in the X25PATHE parameter contain between 1 and 15 decimal digits, and each X25PATHE list entry is specified correctly.
9. ADDDUAR, CHGDUAR
    - The PASSWORD keyword contains an even number of hexadecimal digits.
10. ADDIX25, CHGIX25, DSPIX25, RMVIX25
    - The DTE address in the DTEADR parameter contains between 1 and 15 decimal digits
11. ADDLCLA
    - The PASSWORD parameter, if specified, contains an even number of hexadecimal digits
12. ADDNSAP, CHGNSAP
    - NSAPADR contains an even number of hexadecimal digits (between 2 and 40 digits)
13. ADDOX25, CHGOX25
    - USRGRPID is specified correctly (if specified)
    - USRDTA contains an even number of hexadecimal digits (if specified)
    - PASTHRFCL contains an even number of hexadecimal digits (if specified)

-continued

APPENDIX D
VALIDITY CHECKER PROGRAMS

14. ADDSSEL, CHGSSEL
    - SAPSEL contains an even number of hexadecimal digits (between 2 and 32 digits for presentation or session selectors and between 2 and 64 digits for transport selectors)

The logic overview for the validity checking programs is as follows:
```
xxxxVtoo: PROCEDURE(PARM1@, PARM2@, ..., PARMN@);
    Check special parameters for validity;
    Issue diagnostic message for each error found;
END xxxxVtoo;
```

APPENDIX E
OBJECT SUPPORT PROGRAMS

The object support programs provide an object-oriented interface to the command processing support. Separate programs to add, change, remove, get, and list an object are being provided.

Add Object Program (xxxxIADD)

The logic overview for add object support program is as follows:
```
xxxxIADD: PROCEDURE(XDSDESC@, XDSPARM@, XDSRSLT@);
    Determine if the database server is active;
    if the database server is not active then
        DO;
        Issue unable to communicate with subsystem message;
        Set return code to failed;
        RETURN;
    END;
/* Call the appropriate validation routine                   */
SELECT(XDSOBJID);
    WHEN(#OBABSN)    CALL xxxxVAAB(XDSDESC@, XDSPARM@, XDSRSLT@);
    WHEN(#OBADJN)    CALL xxxxVAAD(XDSDESC@, XDSPARM@, XDSRSLT@);
    WHEN(#OBAGTR)    CALL xxxxVAAG(XDSDESC@, XDSPARM@, XDSRSLT@);
    WHEN(#OBAPPE)    CALL xxxxVAAE(XDSDESC@, XDSPARM@, XDSRSLT@);
    WHEN(#OBAPPM)    CALL xxxxVAAM(XDSDESC@, XDSPARM@, XDSRSLT@);
    WHEN(#OBAPPX)    CALL xxxxVAAX(XDSDESC@, XDSPARM@, XDSRSLT@);
    WHEN(#OBAUNN)    CALL xxxxVAAU(XDSDESC@, XDSPARM@, XDSRSLT@
    WHEN(#OBCLPS)    CALL xxxxVACL(XDSDESC@, XDSPARM@, XDSRSLT@);
    WHEN(#OBCMPS)    CALL xxxxVACM(XDSDESC@, XDSPARM@, XDSRSLT@);
    WHEN(#OBDUAR)    CALL xxxxVADU(XDSDESC@, XDSPARM@, XDSRSLT@);
    WHEN(#OBIX25)    CALL xxxxVAIX(XDSDESC@, XDSPARM@, XDSRSLT@);
    WHEN(#OBLINE)    CALL xxxxVALN(XDSDESC@, XDSPARM@, XDSRSLT@);
    WHEN(#OBLINS)    CALL xxxxVALS(XDSDESC@, XDSPARM@, XDSRSLT@);
    WHEN(#OBMGRR)    CALL xxxxVAMG(XDSDESC@, XDSPARM@, XDSRSLT@);
    WHEN(#OBNSAP)    CALL xxxxVANS(XDSDESC@, XDSPARM@, XDSRSLT@);
    WHEN(#OBOX25)    CALL xxxxVAOX(XDSDESC@, XDSPARM@, XDSRSLT@);
    WHEN(#OBQOSM)    CALL xxxxVAQM(XDSDESC@, XDSPARM@, XDSRSLT@);
    WHEN(#OBRTE )    CALL xxxxVART(XDSDESC@, XDSPARM@, XDSRSLT@);
    WHEN(#OBSSEL)    CALL xxxxVASS(XDSDESC@, XDSPARM@, XDSRSLT@);
    WHEN(#OBSUBN)    CALL xxxxVASU(XDSDESC@, XDSPARM@, XDSRSLT@);
    OTHERWISE SET RETURN CODE TO FAILED;
END;
END xxxxIADD;
```

Change Object Program (xxxxICHG)

The logic overview for change object support program is as follows (NOTE that note all fields in the object need to be changed, only the ones that are meaningful to the user):
```
xxxxICHG: PROCEDURE(XDSDESC@, XDSPARM@, XDSRSLT@);
    Determine if the database server is active;
    if the database server is not active then
        DO;
        Issue unable to communicate with subsystem message;
        Set return code to failed;
        RETURN;
    END;
/* Call the appropriate validation routine                   */
SELECT(XDSOBJID);
    WHEN(#OBABSN)    CALL xxxxVCAB(XDSDESC@, XDSPARM@, XDSRSLT@);
    WHEN(#OBADJN)    CALL xxxxVCAD(XDSDESC@, XDSPARM@, XDSRSLT@);
    WHEN(#OBAPPE)    CALL xxxxVCAE(XDSDESC@, XDSPARM@, XDSRSLT@);
    WHEN(#OBAPPM)    CALL xxxxVCAM(XDSDESC@, XDSPARM@, XDSRSLT@);
    WHEN(#OBAPPX)    CALL xxxxVCAX(XDSDESC@, XDSPARM@, XDSRSLT@);
    WHEN(#OBAUNN)    CALL xxxxVCAU(XDSDESC@, XDSPARM@, XDSRSLT@);
    WHEN(#OBCLPS)    CALL xxxxVCCL(XDSDESC@, XDSPARM@, XDSRSLT@);
    WHEN(#OBCMPS)    CALL xxxxVCCM(XDSDESC@, XDSPARM@, XDSRSLT@);
    WHEN(#OBDUAR)    CALL xxxxVCDU(XDSDESC@, XDSPARM@, XDSRSLT@);
    WHEN(#OBIX25)    CALL xxxxVCIX(XDSDESC@, XDSPARM@, XDSRSLT@);
    WHEN(#OBLCLA)    CALL xxxxVCLA(XDSDESC@, XDSPARM@, XDSRSLT@);
```

APPENDIX E
OBJECT SUPPORT PROGRAMS

```
        WHEN(#OBLINE)    CALL xxxxVCLN(XDSDESC@, XDSPARM@, XDSRSLT@);
        WHEN(#OBLINS)    CALL xxxxVCLS(XDSDESC@, XDSPARM@, XDSRSLT@);
        WHEN(#OBMGRR)    CALL xxxxVCMG(XDSDESC@, XDSPARM@, XDSRSLT@);
        WHEN(#OBNSAP)    CALL xxxxVCNS(XDSDESC@, XDSPARM@, XDSRSLT@);
        WHEN(#OBOX25)    CALL xxxxVCOX(XDSDESC@, XDSPARM@, XDSRSLT@);
        WHEN(#OBQOSM)    CALL xxxxVCQM(XDSDESC@, XDSPARM@, XDSRSLT@);
        WHEN(#OBRTE )    CALL xxxxVCRT(XDSDESC@, XDSPARM@, XDSRSLT@);
        WHEN(#OBSSEL)    CALL xxxxVCSS(XDSDESC@, XDSPARM@, XDSRSLT@);
        WHEN(#OBSUBN)    CALL xxxxVCSU(XDSDESC@, XDSPARM@, XDSRSLT@);
        WHEN(#OBTPTM)    CALL xxxxVCTM(XDSDESC@, XDSPARM@, XDSRSLT@);
        OTHERWISE SET RETURN CODE TO FAILED;
    END;
END xxxxICHG;
```

Remove Object Program (xxxxIRMV)

The logic overview for the remove object support program is as follows:
```
    xxxxIRMV: PROCEDURE(XDSDESC@, XDSPARM@, XDSRSLT@);
        Determine if the database server is active;
        If the database server is not active;
            DO;
                Issue unable to communicate with subsystem message;
                Set return code to failed;
                RETURN;
            END;
    /* Call the appropriate validation routine                     */
        SELECT(XDSOBJID);
            WHEN(#OBABSN)    CALL xxxxVRAB(XDSDESC@, XDSPARM@, XDSRSLT@);
            WHEN(#OBADJN)    CALL xxxxVRAD(XDSDESC@, XDSPARM@, XDSRSLT@);
            WHEN(#OBAGTR)    CALL xxxxVRAG(XDSDESC@, XDSPARM@, XDSRSLT@);
            WHEN(#OBAPPE)    CALL xxxxVRAE(XDSDESC@, XDSPARM@, XDSRSLT@);
            WHEN(#OBAPPM)    CALL xxxxVRAM(XDSDESC@, XDSPARM@, XDSRSLT@);
            WHEN(#OBAPPX)    CALL xxxxVRAX(XDSDESC@, XDSPARM@, XDSRSLT@);
            WHEN(#OBAUNN)    CALL xxxxVRAU(XDSDESC@, XDSPARM@, XDSRSLT@);
            WHEN(#OBCLPS)    CALL xxxxVRCL(XDSDESC@, XDSPARM@, XDSRSLT@);
            WHEN(#OBCMPS)    CALL xxxxVRCM(XDSDESC@, XDSPARM@, XDSRSLT@);
            WHEN(#OBDUAR)    CALL xxxxVRDU(XDSDESC@, XDSPARM@, XDSRSLT@);
            WHEN(#OBIX25)    CALL xxxxVRIX(XDSDESC@, XDSPARM@, XDSRSLT@);
            WHEN(#OBLINE)    CALL xxxxVRLN(XDSDESC@, XDSPARM@, XDSRSLT@);
            WHEN(#OBLINS)    CALL xxxxVRLS(XDSDESC@, XDSPARM@, XDSRSLT@);
            WHEN(#OBMGRR)    CALL xxxxVRMG(XDSDESC@, XDSPARM@, XDSRSLT@);
            WHEN(#OBNSAP)    CALL xxxxVRNS(XDSDESC@, XDSPARM@, XDSRSLT@);
            WHEN(#OBOX25)    CALL xxxxVROX(XDSDESC@, XDSPARM@, XDSRSLT@);
            WHEN(#OBQOSM)    CALL xxxxVRQM(XDSDESC@, XDSPARM@, XDSRSLT@);
            WHEN(#OBRTE )    CALL xxxxVRRT(XDSDESC@, XDSPARM@, XDSRSLT@);
            WHEN(#OBSSEL)    CALL xxxxVRSS(XDSDESC@, XDSPARM@, XDSRSLT@);
            WHEN(#OBSUBN)    CALL xxxxVRSU(XDSDESC@, XDSPARM@, XDSRSLT@);
            WHEN(#OBTPTM)    CALL xxxxVRTM(XDSDESC@, XDSPARM@, XDSRSLT@);
            OTHERWISE SET RETURN CODE TO FAILED;
        END;
END xxxxIRMV;
```

Get Object Program (xxxxIGET)

The logic overview for the get object support program is as follows:
```
    xxxxIGET: PROCEDURE(XDSDESC@, XDSPARM@, XDSRSLT@);
        Determine if the database server is active;
        If the database server is not active;
            DO;
                Issue unable to communicate with subsystem message;
                Set return code to failed;
                RETURN;
            END;
    /* Call the appropriate validation routine
        SELECT(XDSOBJID);
            WHEN(#OBABSN)    CALL xxxxVDAB(XDSDESC@, XDSPARM@, XDSRSLT@);
            WHEN(#OBADJN)    CALL xxxxVDAD(XDSDESC@, XDSPARM@, XDSRSLT@);
            WHEN(#OBAPPE)    CALL xxxxVDAE(XDSDESC@, XDSPARM@, XDSRSLT@);
            WHEN(#OBAPPM)    CALL xxxxVDAM(XDSDESC@, XDSPARM@, XDSRSLT@);
            WHEN(#OBAPPX)    CALL xxxxVDAX(XDSDESC@, XDSPARM@, XDSRSLT@);
            WHEN(#OBAUNN)    CALL xxxxVDAU(XDSDESC@, XDSPARM@, XDSRSLT@);
            WHEN(#OBCLPS)    CALL xxxxVDCL(XDSDESC@, XDSPARM@, XDSRSLT@);
            WHEN(#OBCMPS)    CALL xxxxVDCM(XDSDESC@, XDSPARM@, XDSRSLT@);
            WHEN(#OBDUAR)    CALL xxxxVDDU(XDSDESC@, XDSPARMI, XDSRSLT@);
            WHEN(#OBIX25)    CALL xxxxVDIX(XDSDESC@, XDSPARM@, XDSRSLT@);
            WHEN(#OBLCLA)    CALL xxxxVDLA(XDSDESC@, XDSPARM@, XDSRSLT@);
            WHEN(#OBLINE)    CALL xxxxVDLN(XDSDESC@, XDSPARM@, XDSRSLT@);
            WHEN(#OBLINS)    CALL xxxxVDLS(XDSDESC@, XDSPARM@, XDSRSLT@);
            WHEN(#OBMGRR)    CALL xxxxVDMG(XDSDESC@, XDSPARM@, XDSRSLT@);
            WHEN(#OBNSAP)    CALL xxxxVDNS(XDSDESC@, XDSPARM@, XDSRSLT@);
            WHEN(#OBOX25)    CALL xxxxVDOX(XDSDESC@, XDSPARM@, XDSRSLT@);
            WHEN(#OBQOSM)    CALL xxxxVDQM(XDSDESC@, XDSPARM@, XDSRSLT@);
```

-continued

APPENDIX E
OBJECT SUPPORT PROGRAMS

```
    WHEN(#OBRTE )    CALL xxxxVDRT(XDSDESC@, XDSPARM@, XDSRSLT@);
    WHEN(#OBSSEL)    CALL xxxxVDSS(XDSDESC@, XDSPARM@, XDSRSLT@);
    WHEN(#OBSUBN)    CALL xxxxVDSU(XDSDESC@, XDSPARM@, XDSRSLT@);
    WHEN(#OBTPTM)    CALL xxxxVDTM(XDSDESC@, XDSPARM@, XDSRSLT@);
    OTHERWISE SET RETURN CODE TO FAILED;
  END;
END xxxxIGET;
```
List Object Program (xxxxILST)

The logic overview for the list object support program is as follows:
```
xxxxILST: PROCEDURE(XDSDESC@, XDSPARM@, XDSRSLT@);
    Determine if the database server is active;
    If the database server is not active;
        DO;
            Issue unable to communicate with subsystem message;
            Set return code to bad;
            RETURN;
        END;
    SELECT(XDSOBJID);
    WHEN(#OBAUNN)
        DO;
        /* Get default authority ID nickname from LSP Table          */
        SELECT dnsuper (attribute 05)
        FROM   LSP TABLE (table 01)
        /* Save the nickname in the data area pointed to by          */
        /* XDSDATA@.                                                 */
        END;
    OTHERWISE
        DO;
        /* Perform a generic SELECT to retrieve the requested        */
        /* number of list entries. The caller will provide           */
        /* a predicate buffer and set up the TrKey using the         */
        /* "greater than" operator. If it was indicated that         */
        /* the key data is not unique, a call will be made to        */
        /* xxxxXRDE to sort the list of entries and remove any       */
        /* duplicates. If the number of entries is now less          */
        /* than the number requested, perform another SELECT         */
        /* for (number requested - number received) entries.         */
        /* Call xxxxXRDE to sort and remove duplicates. Keep         */
        /* doing this until the number of entries processed          */
        /* equals the number of entries requested by the CPP         */
        /* or MIS has indicated that there was no more data          */
        /* to be returned. The data for the key of the last          */
        /* returned entry is saved in the predicate buffer           */
        /* for subsequent calls. If MIS indicated that there         */
        /* is no more data to be retrieved, the key in the           */
        /* predicate buffer is set to binary zeros.                  */
        END;
    END;
END xxxxILST;
An example of the logic in a validation program is as follows:
xxxxVtoo: PROCEDURE(XDSDESC@, XDSPARM@, XDSRSLT@);
Get storage;
Set return code to good;
Issue begin transaction macro;
Loop through list entries while return code is good;
    Move entry data to structure;
    Invoke appropriate translator macro(s);
    Select on the return code;
        When(good) Issue informational message;
        Otherwise
            DO;
                Issue diagnostic message;
                Set return code to bad or partial success, depending on the
                particular list entry that failed;
            END;
    END SELECT;
END;
END xxxxVtoo;
```

We claim:

1. A method for constructing a configuration database which uses an object-oriented, hierarchical model for an Open Systems Interconnects (OSI) communications subsystem comprising the following steps:

defining a plurality of object classes, each of said object classes corresponding to at least one function of a plurality of functions defined for a layered computer network communications subsystem, each of said defined functions being associated with at least one layer of said layered computer network communications subsystem;

defining a plurality of objects for each of said object classes, the objects in each object class being associated with said corresponding function, each of said objects being defined by a set of unique attributes associated with said object;

defining a hierarchical relationship between said plurality of object classes, said hierarchical relationship corresponding to a functional relationship between said plurality of functions, said functional relationship defining the relationship of each said function associated with a layer to at least one other of said functions associated with layers above or below said layer in said layered communications subsystem;

defining a set of rules for creating and maintaining a configuration database for providing configuration data to said layered computer network communications subsystem, said set of rules determining a hierarchical relationship among data entered in said configuration database corresponding to said hierarchical relationship between said object classes;

defining a set of operations to be performed on said data entered in said configuration database, each of said operations defined for each of said object classes; and defining a set of object support programs, each of said object support programs associated with at least one operation of said set of operations, each said object support program for performing configuration database tasks defined by said associated operation wherein all the definitions stated above builds the configuration database.

2. A method as in claim 1 wherein each of said set of object support programs includes a set of validation rules for validating said configuration database tasks to be performed and ensuring that said hierarchical relationship among said data entered in said configuration database is maintained.

3. A method as in claim 1 including the further step of defining a plurality of sets of validation rules, each said set of validation rules associated with at least one of said object classes, each said set of validation rules for validating configuration database tasks as defined by said defined operations to be performed on said data entered in said configuration database.

4. A method as in claim 3 wherein each said set of validation rules includes validation rules for ensuring that said hierarchical relationship among said data entered in said configuration database is maintained.

5. A method as in claim 1 wherein said defined set of operations comprises the operations of ADD, REMOVE, CHANGE, GET and LIST, each said operation being defined for each of said defined object classes.

6. A computer system implementing a communications subsystem coupling said computer system to a computer network, said computer system comprising:

at least one user application implemented by said computer system for providing one or more desired user services;

communications support means coupled to said user application for implementing a layered computer network communications subsystem, said layered computer network communications subsystem coupling said computer system to said computer network and providing communications services between said user application and other computer systems on said computer network; and a configuration database subsystem coupled to said communications support means for building and maintaining a configuration database and for providing configuration data to said communications support means for configuration of said layered computer network communications subsystem, said configuration database subsystem implementing an object-oriented, hierarchical presentation of said layered computer network communications subsystem, said object-oriented, hierarchical presentation comprising a plurality of object classes, each of said object classes corresponding to at least one function of a plurality of functions defined for said layered computer network communications subsystem, each of said functions being associated with at least one layer of said layered computer network communications subsystem each said object class being defined by a set of attributes, said plurality of object classes being related in a hierarchical relationship corresponding to a functional relationship defining the relationship of each said function associated with a layer to at least one other of said functions associated with layers above or below said layer in said layered communications subsystem the attributes of a higher level object class including one or more lower level object classes.

7. A computer system as in claim 6 wherein said configuration database subsystem comprises:

user interface means for inputting selected commands, said commands representative of defined operations on data entered in a configuration database;

configuration support means coupled to said user interface and implementing said object-oriented, hierarchical presentation, said configuration support means for executing said input commands and performing configuration database tasks as required by said defined operations; and database means coupled to said configuration support means and to said communications support means for storing data representative of said configuration database and for providing selected data responsive to received requests.

8. A computer system as in claim 7 wherein said configuration database subsystem further includes database server means coupled to said configuration support means and to said database means for translating data from a command data structure to a database structure and for storing data in and retrieving data from said database means.

9. A computer system as in claim 6 wherein said layered computer network communications subsystem comprises an Open Systems Interconnects (OSI) communications subsystem.

10. In a computer system coupled to a computer network, a configuration database subsystem comprising:

user interface means for inputting selected commands, said commands representative of defined operations on data entered in a communications subsystem configuration database;

configuration support means coupled to said user interface and implementing an object-oriented, hierarchical presentation of a layered communications subsystem, said object-oriented, hierarchical presentation comprising a plurality of object classes, each of said object classes corresponding at least one function of a plurality of functions defined for said layered communications subsystem, each of said functions being associated with at least one layer of said layered communications subsystem, said plurality of object classes being related in a hierarchical relationship corresponding to a functional relationship among said plurality of functions, said functional relationship defining the relationship of each said function associated with a layer to at least one other of said functions associated with layers above or below said layer in said layered communications subsystem; and database means coupled to said configuration support means for storing data representative of said configuration database and for providing selected data responsive to received requests.

11. A computer system as in claim 10 wherein said configuration database subsystem further includes database server means coupled to said configuration support means and to said database means for translating data from a command data structure to a database data structure and for storing data in and retrieving data from said database means.

* * * * *

UNITED STATES PATENT AND TRADEMARK OFFICE
CERTIFICATE OF CORRECTION

PATENT NO. : 5,414,812
DATED : May 9, 1995
INVENTOR(S) : Filip et al.

It is certified that error appears in the above-indentified patent and that said Letters Patent is hereby corrected as shown below:

Column 42, line 66, after "corresponding", insert --to--.

Signed and Sealed this

Nineteenth Day of September, 1995

Attest:

BRUCE LEHMAN

Attesting Officer     Commissioner of Patents and Trademarks